US012786022B2

(12) United States Patent
Huang et al.

(10) Patent No.: US 12,786,022 B2
(45) Date of Patent: Nov. 3, 2026

(54) SIGNAL TRANSMISSION METHOD, TERMINAL, NETWORK DEVICE, AND STORAGE MEDIUM

(71) Applicant: DATANG MOBILE COMMUNICATIONS EQUIPMENT CO., LTD., Beijing (CN)

(72) Inventors: Qiuping Huang, Beijing (CN); Xin Su, Beijing (CN); Qiubin Gao, Beijing (CN); Yiwen Lu, Beijing (CN)

(73) Assignee: DATING MOBILE COMMUNICATIONS EQUIPMENT CO., LTD., Beijing (CN)

( * ) Notice: Subject to any disclaimer, the term of this patent is extended or adjusted under 35 U.S.C. 154(b) by 713 days.

(21) Appl. No.: 17/909,392

(22) PCT Filed: Feb. 25, 2021

(86) PCT No.: PCT/CN2021/077881
§ 371 (c)(1),
(2) Date: Sep. 5, 2022

(87) PCT Pub. No.: WO2021/175149
PCT Pub. Date: Sep. 10, 2021

(65) Prior Publication Data

US 2023/0107563 A1 Apr. 6, 2023

(30) Foreign Application Priority Data

Mar. 5, 2020 (CN) ......................... 202010148667.1

(51) Int. Cl.
*H04L 27/00* (2006.01)
*H04L 5/00* (2006.01)
(Continued)

(52) U.S. Cl.
CPC ........ *H04L 27/0014* (2013.01); *H04L 5/0053* (2013.01); *H04L 25/021* (2013.01);
(Continued)

(58) Field of Classification Search
CPC . H04L 27/0014; H04L 5/0053; H04L 25/021; H04L 2027/0026; H04L 5/0035;
(Continued)

(56) References Cited

U.S. PATENT DOCUMENTS

2014/0086083 A1 3/2014 You
2016/0322995 A1 11/2016 Bevan et al.
(Continued)

FOREIGN PATENT DOCUMENTS

CN 101567708 A 10/2009
CN 101867386 A 10/2010
(Continued)

OTHER PUBLICATIONS

Supplementary European Search Report of Corresponding European Patent Application No. 21765448.2 Dated Mar. 21, 2024.
(Continued)

*Primary Examiner* — Jae Y Lee
*Assistant Examiner* — Haeshil Jessica Choi
(74) *Attorney, Agent, or Firm* — KILPATRICK TOWNSEND & STOCKTON LLP

(57) ABSTRACT

Embodiments of the present application provide a signal transmission method, a terminal, a network device, and a storage medium. The method includes: receiving multiple first downlink signals; determining a downlink receiving frequency corresponding to each of the multiple first downlink signals, and determining a transmitting frequency of an uplink signal associated with the first downlink signal based on the downlink receiving frequency, and transmitting the uplink signal based on the transmitting frequency of the
(Continued)

uplink signal, and a frequency shift determined based on the uplink signal associated with the first downlink signal is used to determine a transmitting frequency of a second downlink signal. In the embodiments of the present application, a pre-compensation of a downlink Doppler shift is performed by means of each transmission receiving point, and therefore, an error of channel estimation is reduced, and the performance of downlink transmission is improved.

21 Claims, 4 Drawing Sheets

(51) Int. Cl.
*H04L 25/02* (2006.01)
*H04W 72/0453* (2023.01)
*H04W 72/23* (2023.01)

(52) U.S. Cl.
CPC ....... *H04W 72/0453* (2013.01); *H04W 72/23* (2023.01); *H04L 2027/0026* (2013.01)

(58) Field of Classification Search
CPC ... H04L 5/0023; H04L 5/0094; H04L 5/0005; H04L 5/0048; H04W 72/0453; H04W 72/23; H04W 72/0446; H04W 72/046; H04W 72/1268; H04W 72/21; H04B 7/01
USPC ........................................................... 370/252
See application file for complete search history.

(56) References Cited

U.S. PATENT DOCUMENTS

| | | | | |
|---|---|---|---|---|
| 2018/0139030 | A1* | 5/2018 | Kim | H04L 5/0053 |
| 2019/0007246 | A1 | 1/2019 | Fertonani et al. | |
| 2020/0036414 | A1* | 1/2020 | Shattil | H04B 1/0003 |
| 2020/0178280 | A1* | 6/2020 | Guan | H04L 5/006 |
| 2020/0186232 | A1* | 6/2020 | Levitsky | H04W 24/10 |
| 2021/0160804 | A1* | 5/2021 | Akkarakaran | H04W 72/51 |
| 2022/0393809 | A1* | 12/2022 | Gao | H04B 7/01 |
| 2023/0008939 | A1* | 1/2023 | Gao | H04W 72/12 |
| 2023/0054715 | A1* | 2/2023 | Li | H04B 7/1855 |

FOREIGN PATENT DOCUMENTS

| | | | | |
|---|---|---|---|---|
| CN | 102932808 | A | 2/2013 | |
| CN | 105704076 | A | 6/2016 | |
| CN | 107889150 | A | 4/2018 | |
| CN | 107911325 | A | 4/2018 | |
| CN | 108282198 | A | 7/2018 | |
| CN | 109005135 | A | 12/2018 | |
| CN | 113365349 | A | 9/2021 | |
| EP | 3576489 | A1 | 12/2019 | |
| JP | H11501468 | A | 2/1999 | |
| JP | 2012085237 | A | 4/2012 | |
| JP | 2020506583 | A | 2/2020 | |
| WO | 2007015394 | A1 | 2/2007 | |
| WO | 2014083361 | A1 | 6/2014 | |
| WO | WO-2019105325 | A1 * | 6/2019 | H04L 27/0014 |
| WO | 2019154423 | A1 | 8/2019 | |
| WO | 2020003469 | A1 | 1/2020 | |
| WO | 2021093197 | A1 | 5/2021 | |

OTHER PUBLICATIONS

CMCC: "Motivation for high-speed train enhancement in Rel-17 NR MIMO", 3GPP Draft; RP-192729, 3rd Generation Partnership Project ( 3GPP), Mobile Competence Centre; 650, Route Des Lucioles; F-06921 Sophia-Antipolis Cedex; France vol. TSG RAN, No. Sitges, Spain; Dec. 9, 2019-Dec. 12, 2019; Dec. 2, 2019 (Dec. 2, 2019), XP051834334.
VIVO: "Evaluation and discussion on HST-SFN schemes", 3GPP Draft; R1-2005367, 3rd Generation Partnership Project (3GPP), Mobile Competence Centre; 650, Route Des Lucioles; F-06921 Sophia-Antipolis Cedex; France, vol. RAN WG1, No. e-Meeting; Aug. 17, 2020-Aug. 28, 2020; Aug. 8, 2020 (Aug. 8, 2020), XP052346741.
Office Action of Corresponding Japanese Patent Application No. 2022-553210 Dated Sep. 22, 2023.
Office Action of Corresponding Korean Patent Application No. 10-2022-7032200 Dated Jan. 15, 2025.
Ericsson; "Transmission scheme in NR PDSCH demodulation requirements for HST"; 3GPP TSG RAN WG4 Meeting 94-e Electronic, Meeting, Mar. 24-6, 2020; R4-2001357.
MediaTek Inc.; "Beam management in HST with DPS transmission scheme"; 3GPP TSG-RAN WG4 Meeting #92bis Chongqing, China, Oct. 14-18, 2019; R4-1910825.
Office Action of Corresponding Indian Patent Application No. 202247055988 Dated Jan. 31, 2025.

* cited by examiner

SIGNAL TRANSMISSION METHOD, TERMINAL, NETWORK DEVICE, AND STORAGE MEDIUM

CROSS-REFERENCE TO RELATED APPLICATION

The present application is a US National Stage of International Application No. PCT/CN2021/077881, filed on Feb. 25, 2021, which claims priority to Chinese application, No. 2020101486671, filed on Mar. 5, 2020, entitled "Signal Transmission Method, Terminal, Network Device and Storage Medium", which are hereby incorporated by reference in their entireties.

FIELD

The present application relates to the field of wireless communication, and in particular, to a method for transmitting signals, a terminal, a network device and a storage medium.

BACKGROUND

Coordinated multiple points is a means in a wireless communication system. Distributed transmission through multiple distributed transmission and reception points may improve the coverage of the cell edge and reduce a delay and signaling overhead caused by handover. For example, in order to avoid frequent cell handover by a terminal user equipment (UE) in a high speed train occasion, a deployment method of single frequency network (SFN) is usually adopted, which is referred to as a high speed train-single frequency network (HST-SFN) occasion. In the HST-SFN occasion, there are multiple transmission and reception points, such as remote radio heads (RRHs), in a cell, and signals are simultaneously transmitted from the multiple transmission and reception points. When a train runs between two adjacent transmission and reception points, such as two adjacent RRHs, one of signals from the two RRHs has a negative Doppler shift and the other thereof has a positive Doppler shift, which will generate a Doppler spectrum. The Doppler shift may have a very large variation range due to a fast moving speed of the train and thus the terminal cannot demodulate the downlink signal well.

In order to solve a problem that signals from different RRHs received by the terminal have opposite Doppler shifts, a used method is to pre-compensate Doppler shift at each RRH respectively to eliminate Doppler spread of downlink signal received by the UE. However, during transmission of multiple points in the related art, the UE only determines one downlink frequency, and transmits uplink signals based on the downlink frequency. The Doppler shifts experienced by the uplink signals during arriving at the RRHs are different due to different geographic locations of the RRHs and/or different directions of receiving beams. The RRHs cannot estimate the Doppler shifts experienced by the downlink or uplink signals since the RRHs are unaware that the UE transmits the uplink signals based on which downlink frequency, and thus the Doppler shifts cannot be effectively pre-compensated.

SUMMARY

In view of problems in the related art, embodiments of the present application provide a method for transmitting signals, a terminal, a network device, and a storage medium.

One embodiment of the present application, provided is a method for transmitting signals, including:

receiving multiple first downlink signals;

determining a downlink receiving frequency corresponding to each of the multiple first downlink signals, and determining a transmitting frequency of an uplink signal associated with the first downlink signal based on the downlink receiving frequency corresponding to the first downlink signal, and transmitting the uplink signal based on the transmitting frequency of the uplink signal, where a frequency shift determined based on the uplink signal associated with the first downlink signal is used to determine a transmitting frequency of a second downlink signal.

In an embodiment, the association between the first downlink signal and the uplink signal includes one or more of the following:

one or more channel properties and/or spatial transmitter (Tx) parameters of the uplink signal are inferred from one or more channel properties and/or spatial transmitter (Tx) parameters of the first downlink signal, and a receiving terminal of the uplink signal and a transmitting terminal of the first downlink signal are the same network device.

In an embodiment, the association is quasi co-located (QCL), and a type of the association includes one or more of:

Type 1: {Doppler shift, Doppler spread, average delay, delay spread};

Type 2: {Doppler shift, Doppler spread};

Type 3: {Doppler shift, average delay};

Type 4: {Spatial receiver (Rx) parameter} or {Spatial Relation Inofo};

Type 5: {Doppler shift}; or

Type 6: Frequency relation information.

In an embodiment, the association is indicated by configuration information for the uplink signal or trigger information for the uplink signal.

In an embodiment, the configuration information for the uplink signal or trigger information for the uplink signal includes multiple information for the first downlink signal associated with the uplink signal. The method further includes: determining the first downlink signal associated with the uplink signal according to an activation signal transmitted by the network device, or further includes determining the association according to a trigger state when the uplink signal is triggered, where each association is associated with one trigger state, or the configuration information for the uplink signal or trigger information for the uplink signal further includes identifier information, and the identifier information is used for indicating a position of a resource corresponding to the first downlink signal in a resource set in which the resource corresponding to the first downlink signal is present, where the first downlink signal is associated with the uplink signal.

In an embodiment, the configuration information for the uplink signal or trigger information for the uplink signal and the first downlink signal includes identifier information for indicating the association, or the configuration information for the first downlink signal or trigger information for the first downlink signal includes identifier information, all uplink signals correspond to a same resource set, and the uplink signal corresponding to the resource set is in one-to-one correspondence with the identifier information, or the first downlink signal and the uplink signal respectively correspond to different resource sets, and one-to-one correspondences are predefined between an uplink resource and a first downlink resource included in different resource sets.

In an embodiment, the association is indicated by configuration information for the first downlink signal or trigger information for the first downlink signal.

In an embodiment, the configuration information for the first downlink signal includes multiple information of an uplink signal associated with the first downlink signal; the method further includes: determining the uplink signal associated with the first downlink signal according to an activation signal transmitted by a network device, or further includes determining the association according to a trigger state when the first downlink signal is triggered, where each association is associated with one trigger state, or the configuration information for the first downlink signal or trigger information for the first downlink signal further includes identifier information, and the identifier information is used for indicating a position of a resource corresponding to the uplink signal associated with the first downlink signal in a resource set in which the resource corresponding to the uplink signal is present.

In an embodiment, the transmitting the uplink signal based on the transmitting frequency of the uplink signal includes one or more of the following:

uplink signals are allocated on different time domain resources;

the uplink signals are allocated on different frequency domain resources, and a guard interval exists between different uplink signals; or the uplink signals are not transmitted simultaneously with an uplink signal for other purposes.

In an embodiment, the uplink signal includes, but not limited to, one or more of the following: a sounding reference signal (SRS), a random access channel (RACH), a physical uplink shared channel (PUSCH), a physical uplink control channel (PUCCH), a demodulation reference signal (DMRS) corresponding to PUSCH, or a DMRS corresponding to PUCCH.

In an embodiment, the first downlink signal includes, but not limited to, one or more of the following: a synchronization signal block (SSB), a tracking reference signal (TRS) or a non-zero power (NZP)-channel state information reference signal (CSI RS).

In an embodiment, the first downlink signal is determined based on one or more of the following information:

indication information at the network side;

configuration information on the downlink signal; or a type of the downlink signal.

One embodiment of the present application, provided is a method for transmitting signals, including:

transmitting first downlink signals to a terminal for indicating the terminal to determine a transmitting frequency of an uplink signal associated with the first downlink signal based on a downlink receiving frequency corresponding to the first downlink signal, receiving the uplink signal associated with the first downlink signal transmitted by the terminal based on the transmitting frequency; and determining a transmitting frequency of a second downlink signal based on a frequency shift determined from the uplink signal.

In an embodiment, the determining a transmitting frequency of a second downlink signal based on the frequency shift determined from the uplink signal includes:

determining a frequency adjustment value of the second downlink signal based on the frequency shift; and determining a transmitting frequency of the second downlink signal using the frequency adjustment value.

In an embodiment, the association between the first downlink signal and the uplink signal includes one or more of the following:

one or more channel properties and/or spatial transmitter (Tx) parameters of the uplink signal are inferred from one or more channel properties and/or spatial transmitter (Tx) parameters of the first downlink signal, or a receiving terminal of the uplink signal and a transmitting terminal of the first downlink signal are the same network device.

In an embodiment, the association is quasi co-located (QCL), and a type of the association includes one or more of:

Type 1: {Doppler shift, Doppler spread, average delay, delay spread};

Type 2: {Doppler shift, Doppler spread};

Type 3: {Doppler shift, average delay};

Type 4: {Spatial Rx parameter} or {Spatial Relation Inofo};

Type 5: {Doppler shift}; or

Type 6: Frequency relation information.

In an embodiment, the association is indicated by configuration information for the uplink signal or trigger information for the uplink signal.

In an embodiment, the processor is further used for: the configuration information for the uplink signal or trigger information for the uplink signal includes multiple information for the first downlink signal associated with the uplink signal. The method further includes: transmitting, by a network side, an activation signal and determining, by the terminal, the first downlink signal associated with the uplink signal; or transmitting, by the network side, a trigger signal to trigger the uplink signal and determining, by the terminal, the association according to a trigger state when the uplink signal is triggered, where each association is associated with one trigger state, or the configuration information for the uplink signal or trigger information for the uplink signal further includes identifier information, and the identifier information is used for indicating a position of a resource corresponding to the first downlink signal in a resource set in which the resource corresponding to the first downlink signal is present, where the first downlink signal is associated with the uplink signal.

In an embodiment, the configuration information for the uplink signal or trigger information for the uplink signal and the first downlink signal includes identifier information for indicating the association, or the configuration information for the first downlink signal or trigger information for the first downlink signal includes identifier information, all uplink signals correspond to a same resource set, and the uplink signal corresponding to the resource set is in one-to-one correspondence with the identifier information, or the first downlink signal and the uplink signal respectively correspond to different resource sets, and one-to-one correspondences are predefined between an uplink resource and a first downlink resource included in different resource sets.

In an embodiment, the association are indicated by configuration information for the first downlink signal or the trigger information for the first downlink signal.

In an embodiment, the processor is further used for: the configuration information for the first downlink signal further includes multiple information of an uplink signal associated with the first downlink signal; the method further includes: transmitting, by a network side, an activation signal and determining, by the terminal, the uplink signals associated with the first downlink signal; or transmitting, by the network side, a trigger signal to trigger the first downlink signal and determining, by the terminal, the association according to a trigger state, where each association is associated with one trigger state, or the configuration information for the first downlink signal or trigger information for the first downlink signal further includes identifier information, and the identifier information is used for indicating a position of a resource corresponding to the uplink signal associated with the first downlink signal in a resource set in which the resource corresponding to the uplink signal is present.

In an embodiment, the uplink signals are transmitted by one or more of the following modes:

uplink signals are allocated on different time domain resources;

the uplink signals are allocated on different frequency domain resources, and a guard interval exists between different uplink signals; or the uplink signals are not transmitted simultaneously with an uplink signal for other purposes.

In an embodiment, the uplink signal includes, but not limited to, one or more of the following: a sounding reference signal (SRS), a random access channel (RACH), a physical uplink shared channel (PUSCH), a physical uplink control channel (PUCCH), a demodulation reference signal (DMRS) corresponding to PUSCH, or a DMRS corresponding to the PUCCH.

In an embodiment, the first downlink signal includes, but not limited to, one or more of the following: a synchronization signal block (SSB), a tracking reference signal (TRS) or a non-zero power (NZP)-channel state information reference signal (CSI RS).

In an embodiment, the network side indicates the first downlink signal to the terminal based on one or more of the following information:

indication information at the network side;

configuration information on the downlink signal; or a type of the downlink signal.

One embodiment of the present application, provided is a terminal, including:

a first receiving device, configured to receive multiple first downlink signals;

a first determining device, configured to determine a downlink receiving frequency corresponding to each of the multiple first downlink signals, and determine a transmitting frequency of an uplink signal associated with the first downlink signal based on the downlink receiving frequency, and a first transmitting device, configured to transmit the uplink signal based on the transmitting frequency of the uplink signal, where a frequency shift determined based on the uplink signal associated with the first downlink signal is used to determine a transmitting frequency of a second downlink signal.

One embodiment of the present application, provided is a terminal, including a memory, a processor, and a program stored in the memory and executable on the processor, which, when executed by the processor, causes the processor to implement the following steps:

receiving multiple first downlink signals;

determining a downlink receiving frequency corresponding to each of the multiple first downlink signals, and determining a transmitting frequency of an uplink signal associated with the first downlink signal based on the downlink receiving frequency corresponding to the first downlink signal, and transmitting the uplink signal based on the transmitting frequency of the uplink signal, where a frequency shift determined based on the uplink signal associated with the first downlink signal is use to determine a transmitting frequency of a second downlink signal.

In an embodiment, the association between the first downlink signal and the uplink signal includes one or more of the following:

one or more channel properties and/or spatial transmitter (Tx) parameters of the uplink signal are inferred from one or more channel properties and/or spatial transmitter (Tx) parameters of the first downlink signal, and a receiving terminal of the uplink signal and a transmitting terminal of the first downlink signal are the same network device.

In an embodiment, the association is quasi co-located (QCL), and a type of the association includes one or more of:

Type 1: {Doppler shift, Doppler spread, average delay, delay spread};

Type 2: {Doppler shift, Doppler spread};

Type 3: {Doppler shift, average delay};

Type 4: {Spatial Rx parameter} or {Spatial Relation Inofo};

Type 5: {Doppler shift}; or

Type 6: Frequency relation information.

In an embodiment, the association is indicated by configuration information for the uplink signal or trigger information for the uplink signal.

In an embodiment, the configuration information for the uplink signal or trigger information for the uplink signal includes multiple information for the first downlink signal associated with the uplink signal. The method further includes: determining the first downlink signal associated with the uplink signal according to an activation signal transmitted by a network device, or further includes determining the association according to a trigger state when the uplink signal is triggered, where each association is associated with one trigger state, or the configuration information for the uplink signal or trigger information for the uplink signal further includes identifier information, and the identifier information is used for indicating a position of a resource corresponding to the first downlink signal in a resource set in which the resource corresponding to the first downlink signal is present, where the first downlink signal is associated with the uplink signal.

In an embodiment, the configuration information for the uplink signal or trigger information for the uplink signal and the first downlink signal includes identifier information for indicating the association, or the configuration information for the first downlink signal or trigger information for the first downlink signal includes identifier information, all uplink signals correspond to a same resource set, and the uplink signal corresponding to the resource set is in one-to-one correspondence with the identifier information, or the first downlink signal and the uplink signal respectively correspond to different resource sets, and one-to-one correspondences are predefined between an uplink resource and a first downlink resource included in different resource sets.

In an embodiment, the association is indicated by configuration information for the first downlink signal or trigger information for the first downlink signal.

In an embodiment, the configuration information for the first downlink signal includes multiple information of an uplink signal associated with the first downlink signal; the processor is further used for: determining the uplink signal associated with the first downlink signal according to an activation signal transmitted by a network device, or further used for: determining the association according to a trigger state when the first downlink signal is triggered, where each association is associated with one trigger state, or the configuration information for the first downlink signal or trigger information for the first downlink signal further includes identifier information, and the identifier information is used for indicating a position of a resource corresponding to the uplink signal associated with the first downlink signal in a resource set in which the resource corresponding to the uplink signal is present.

In an embodiment, the transmitting the uplink signal based on the transmitting frequency of the uplink signal includes one or more of the following:

uplink signals are allocated on different time domain resources;

the uplink signals are allocated on different frequency domain resources, and a guard interval exists between different uplink signals; or the uplink signals are not transmitted simultaneously with an uplink signal for other purposes.

In an embodiment, the uplink signal includes, but not limited to, one or more of the following: a sounding reference signal (SRS), a random access channel (RACH), a physical uplink shared channel (PUSCH), a physical uplink control channel (PUCCH), a demodulation reference signal (DMRS) corresponding to PUSCH, or a DMRS corresponding to the PUCCH.

In an embodiment, the first downlink signal includes, but not limited to, one or more of the following: a synchronization signal block (SSB), a tracking reference signal (TRS) or a non-zero power (NZP)-channel state information reference signal (CSI RS).

In an embodiment, the first downlink signal is determined based on one or more of the following information:

indication information at the network side;

configuration information on the downlink signal; or a type of the downlink signal.

One embodiment of the present application, provided is a network device, including:

a second transmitting device, configured to transmit a first downlink signal to a terminal for indicating the terminal to determine a transmitting frequency of an uplink signal associated with the first downlink signal based on a downlink receiving frequency corresponding to the first downlink signal, a second receiving device, configured to receive the uplink signal associated with the first downlink signal transmitted by the terminal based on the transmitting frequency; and a second determining device, configured to determine a transmitting frequency of a second downlink signal based on a frequency shift determined from the uplink signal.

One embodiment of the present application, provided is another network device, including a memory, a processor, and a program stored in the memory and executable on the processor, which, when executed by the processor, causes the processor to implement the following steps:

transmitting first downlink signals to a terminal for indicating the terminal to determine a transmitting frequency of an uplink signal associated with the first downlink signal based on a downlink receiving frequency corresponding to the first downlink signal, receiving the uplink signal transmitted by the terminal based on the transmitting frequency and associated with the first downlink signal; and determining a transmitting frequency of a second downlink signal based on a frequency shift determined from the uplink signal.

In an embodiment, the determining a transmitting frequency of a second downlink signal based on the frequency shift determined from the uplink signal includes:

determining a frequency adjustment value of the second downlink signal based on the frequency shift; and determining a transmitting frequency of the second downlink signal using the frequency adjustment value.

In an embodiment, the association between the first downlink signal and the uplink signal includes one or more of the following:

one or more channel properties and/or spatial transmitter (Tx) parameters of the uplink signal may be inferred from one or more channel properties and/or spatial transmitter (Tx) parameters of the first downlink signal, or a receiving terminal of the uplink signal and a transmitting terminal of the first downlink signal are the same network device.

In an embodiment, the association is quasi co-located (QCL), and a type of the association includes one or more of:

Type 1: {Doppler shift, Doppler spread, average delay, delay spread};

Type 2: {Doppler shift, Doppler spread};

Type 3: {Doppler shift, average delay};

Type 4: {Spatial Rx parameter} or {Spatial Relation Inofo};

Type 5: {Doppler shift}; or

Type 6: Frequency relation information.

In an embodiment, the association is indicated by configuration information for the uplink signal or trigger information for the uplink signal.

In an embodiment, the configuration information for the uplink signal includes multiple information of the first downlink signal associated with the uplink signal. The processor is further used for: transmitting, by a network side, an activation signal and determining, by the terminal, the first downlink signal associated with the uplink signal; or transmitting, by the network side, a trigger signal to trigger the uplink signal and determining, by the terminal, the association according to a trigger state, where each association is associated with one trigger state, or the configuration information for the uplink signal or trigger information for the uplink signal further includes identifier information, and the identifier information is used for indicating a position of a resource corresponding to the first downlink signal in a resource set in which the resource corresponding to the first downlink signal is present, where the first downlink signal is associated with the uplink signal.

In an embodiment, the configuration information for the uplink signal or trigger information for the uplink signal and the first downlink signal includes identifier information for indicating the association, or the configuration information for the first downlink signal or trigger information for the first downlink signal includes identifier information, all uplink signals correspond to a same resource set, and the uplink signal corresponding to the resource set is in one-to-one correspondence with the identifier information, or the first downlink signal and the uplink signal respectively correspond to different resource sets, and one-to-one correspondences are predefined between an uplink resource and a first downlink resource included in different resource sets.

In an embodiment, the association is indicated by configuration information for the first downlink signal or trigger information for the first downlink signal.

In an embodiment, the configuration information for the first downlink signal further includes multiple information of an uplink signal associated with the first downlink signal; the processor is further used for: transmitting, by a network side, an activation signal and determining, by the terminal, the uplink signals associated with the first downlink signal; or transmitting, by the network side, a trigger signal to trigger the first downlink signal and determining, by the terminal, the association according to the trigger state, where each association is associated with one trigger state, or the configuration information for the first downlink signal or trigger information for the first downlink signal further includes identifier information, and the identifier information is used for indicating a position of a resource corresponding to the uplink signal associated with the first downlink signal in a resource set in which the resource corresponding to the uplink signal is present.

In an embodiment, the uplink signals are transmitted by one or more of the following modes:

uplink signals are allocated on different time domain resources;

the uplink signals are allocated on different frequency domain resources, and a guard interval exists between different uplink signals; or the uplink signals are not transmitted simultaneously with an uplink signal for other purposes.

In an embodiment, the uplink signal includes, but not limited to, one or more of the following: a sounding reference signal (SRS), a random access channel (RACH), a physical uplink shared channel (PUSCH), a physical uplink control channel (PUCCH), a demodulation reference signal (DMRS) corresponding to PUSCH, or a DMRS corresponding to the PUCCH.

In an embodiment, the first downlink signal includes, but not limited to, one or more of the following: a synchronization signal block (SSB), a tracking reference signal (TRS) or a non-zero power (NZP)-channel state information reference signal (CSI RS).

In an embodiment, the terminal is indicated to determine whether a downlink signal is the first downlink signal based on one or more of the following information:

indication information at the network side;

configuration information on the downlink signal; or a type of the downlink signal.

One embodiment of the present application, provided is a non-transitory computer-readable storage medium having stored thereon a computer program, that, when executed by a processor, causes the processor to implement steps of the method according to the embodiments.

One embodiment of the present application, provided is a non-transitory computer-readable storage medium having stored thereon a computer program, that, when executed by a processor, causes the processor to implement steps of the method according to the embodiments.

By the methods for transmitting signals, the terminal, the network device and storage medium according to the embodiments of the present application, the terminal determines a corresponding downlink receiving frequency for each received first downlink signal, and determines transmitting frequency of each uplink signal based on the corresponding downlink receiving frequency. Each first downlink signal and each uplink signal have a preset association respectively, and each transmission and reception point can independently perform shift estimation and pre-compensation. The error of channel estimation is reduced and the downlink transmission performance is improved since the downlink Doppler shift is pre-compensated at each transmission and reception point.

BRIEF DESCRIPTION OF THE DRAWINGS

The embodiments of the present application are illustrated in the accompanying drawings. It should be noted that the drawings in the following description are some embodiments of the present application.

DETAILED DESCRIPTION

Figure 1:
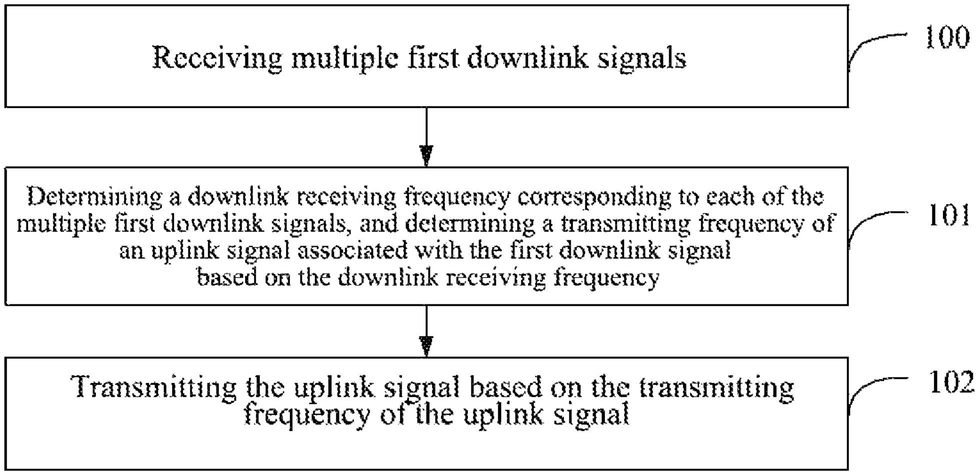
FIG. 1 is a schematic flowchart of a method for transmitting signals according to an embodiment of the present application.

The embodiments of the present application will be described below clearly and completely in conjunction with the drawings in the embodiments of the present application, and it should be noted that the described embodiments are some, but not all embodiments of the present application.

In the HST-SFN occasion, multiple transmission and reception points (TRPs) (for example, which can be some RRHs) are connected to the same base band unit (BBU) through optical fibers, and these multiple TRPs use the same cell ID. The coverage of the cell is expanded, by connecting multiple TRPs, to reduce the cell handover frequency of the terminal. It can be considered that there is an ideal backhaul between these TRPs since the TRPs are connected to the BBU through optical fibers. A typical transmission scheme in the HST-SFN occasion is to transmit downlink signals from all TRPs connected to one BBU simultaneously, that is to say, all TRPs transmit same codeword, layer and demodulation reference signal (DMRS) port, and thus multiple TRPs are equivalent to forming more paths. When a train runs between two adjacent TRPs, one of signals from the two adjacent TRPs has a negative Doppler shift and the other thereof has a positive Doppler shift, which will generate a Doppler spectrum. The Doppler shift may have a very large variation range due to a fast moving speed of the train, and thus the terminal cannot demodulate the downlink signal well.

In order to solve a problem that signals from different TRPs received by the terminal have opposite Doppler shifts, a used method is to pre-compensate Doppler shift at each TRP respectively to eliminate Doppler spread of downlink signal received by the UE. However, the UE in the related art detects synchronization signal block (SSB) (sometimes also referred to as synchronization signal/physical broadcast channel block (SS/PBCH block)), obtains downlink frequency point according to the detected SSB, obtains uplink frequency point based on the downlink frequency point and performs transmission of uplink signal at the uplink frequency point. When the UE is in a moving state, the downlink frequency point obtained by the UE includes the downlink Doppler shift, and an uplink Doppler shift is further superimposed during uplink transmission. Therefore, during single-point transmission, the frequency when the uplink signal is received at the TRP has a Doppler shift of 2 times relative to the uplink frequency point on the TRP side. During multi-points transmission, although the downlink frequency points of the TRPs are the same, the Doppler shifts at the UE are different due to different geographical locations. However, the UE only determines one downlink frequency point, and transmits the uplink signal based on the downlink frequency point. The Doppler shifts experienced by the uplink signals during arriving at the TRPs are different due to different directions of receiving beams and/or different geographic locations of the TRPs. The TRP cannot estimate the Doppler shift experienced by the downlink or uplink signal since the TRP is unaware that the UE transmits the uplink signal based on which downlink frequency point, and thus the Doppler shift cannot be effectively pre-compensated.

In order to solve the problem of poor demodulation performance caused by the signals received by the terminal have Doppler shifts with opposite directions when multiple transmission and reception points transmit data simultaneously in the high-speed train SFN deployment occasion, embodiments of the present application provide a signal transmission solution for multiple transmission and reception points based on frequency pre-compensation. For example, the terminal determines the transmitting frequency (frequency point) of the uplink signal which will be transmitted to the transmission and reception point (TRP) according to downlink signal transmitted by this TRP, and performs transmission of the uplink signal using the transmitting frequency, and the TRP can obtain Doppler shift of the terminal relative to itself and frequency pre-compensation can be realized at the TRP, and thus Doppler shift and Doppler spread on the terminal side are eliminated. The methods according to the embodiments of the present application may be applicable to systems including but not limited to 5G systems (eg, NR (New Radio) systems), LTE systems, 6G systems, satellite systems, Internet of Vehicles systems, and systems of their evolved versions.

In various embodiments of the present application, the network device may be a base station, and the base station may include multiple transmission and reception points (TRPs) or TRP groups. For each TRP, the TRP may transmit first downlink signals, the UE may transmit the associated uplink signal, and the base station determines a pre-compensated frequency for the TRP. For each TRP group, one TRP in the TRP group may transmit first downlink signals, the UE may transmit the associated uplink signal, and the base station determines pre-compensated frequencies for all TRPs in the TRP group. The TRP may be an RRH, and the TRP group may be an RRH group.

Network side device provided by the embodiments of the present application may include, but not limited to, one or more of the following: a commonly used base station, an evolved node base station (eNB), and a network side device (for example, next generation node base station (gNB) or transmission and reception point (TRP) in a 5G system and other devices.

The terminal provided by the embodiments of the present application may be referred to as user equipment (UE) or the like. And the terminal may include, but not limited to, a handheld device and a vehicle-mounted device. For example, it can be a mobile phone, a tablet computer, a notebook computer, an ultra-mobile personal computer (UMPC), a netbook, or a personal digital assistant (PDA).

FIG. 1 is a schematic flowchart of a method for transmitting signals according to an embodiment of the present application. As shown in FIG. 1, the method may be performed by a terminal (for example, a user equipment UE), and at least includes the following steps:

step 100, receiving multiple first downlink signals.

In the HST-SFN occasion, the UE receives first downlink signals transmitted by multiple transmission and reception points (TRPs) respectively, for example, there are multiple transmission and reception points (TRPs) in the HST-SFN occasion, and each TRP will transmit its first downlink signals to an UE entering the HST-SFN occasion. In order to solve the problem in the related art that the TRP cannot estimate the Doppler shift experienced by the downlink or uplink signal, and thus the pre-compensation of the Doppler shift cannot be effectively performed, the first downlink signal transmitted to the UE by every TRP in the method according to the embodiment of the present application has a association with an uplink signal, and the UE transmits the uplink signal based on the association.

Step 101: determining a downlink receiving frequency corresponding to each of the multiple first downlink signals, and determining a transmitting frequency of an uplink signal associated with the first downlink signal based on the downlink receiving frequency corresponding to the first downlink signal.

After receiving the multiple first downlink signals, the UE may first determine a downlink receiving frequency corresponding to each of the multiple first downlink signals. The downlink receiving frequency described in the embodiment of the present application may refers to a frequency at which the first downlink signal reach the UE, or a downlink frequency point corresponding to the first downlink signal determined by the UE. It is noted that there may be an offset between the downlink receiving frequency for the first downlink signal determined by the UE and the actual frequency at which the downlink signal reaches the UE due to factors such as device influence, inaccurate channel estimation, algorithms and the like. A frequency point refers to a reference frequency, for example, a frequency point refers to a frequency that can be used to determine a frequency location of the downlink radio frequency channel and/or SSB and/or other units. For example, the downlink frequency point may be a reference frequency used to determine one or more downlink transmission frequencies for downlink channel (e.g., physical downlink shared channel (PDSCH), physical downlink control channel (PDCCH), etc.), SSB, and downlink reference signal (e.g., downlink DMRS, channel state information-reference signal (CSI-RS), tracking reference signal (TRS)). For example, the uplink frequency point may be a reference frequency used to determine one or more uplink transmission frequencies for uplink channel (a physical uplink shared channel (PUSCH), a physical uplink control channel (PUCCH), a random access channel (RACH), etc.), and uplink reference signal (e.g., a sounding reference signal (SRS)).

In an embodiment, the UE determines a downlink receiving frequency corresponding to each of the multiple first downlink signals according to one or more first downlink signals, and the downlink receiving frequencies corresponding to all the first downlink signal are the same. A possible way is that the UE determines a downlink frequency point, and the downlink frequency point is used as the downlink receiving frequency corresponding to each first downlink signal determined by the UE.

In an embodiment, the UE determines a downlink receiving frequency corresponding to each of the multiple first downlink signals according to the first downlink signal, and the downlink receiving frequency corresponding to each of the multiple first downlink signals may be the same or different. A possible way is that the UE determines a downlink frequency point for each first downlink signal, and the obtained downlink frequency points are used as the downlink receiving frequency corresponding to each of the multiple first downlink signals.

There may have various schemes by which the UE determines a transmitting frequency of the uplink signals associated with the first downlink signal based on the downlink receiving frequency corresponding to the first downlink signal.

In an embodiment, the UE determines the transmitting frequency of the uplink signal based on the same downlink receiving frequency.

In an embodiment, the UE determines a downlink frequency point, and then determines an uplink frequency point based on the downlink frequency point in combination with a frequency shift between the uplink and the downlink. The UE determines a Doppler offset of each first downlink signal relative to the downlink frequency point according to each first downlink signal. When determining a transmitting frequency of an uplink signal, the UE determines an actual frequency point of the uplink signal by adding the uplink frequency point to the Doppler offset of the first downlink signal having the above-mentioned association with the uplink signal, and determines the transmitting frequency of the uplink signal based on the actual frequency point.

In an embodiment, the UE determines a Doppler offset of each first downlink signal relative to the downlink frequency point according to each first downlink signal, determines a downlink receiving frequency for the first downlink signal based on the Doppler offset corresponding to the first downlink signal and the downlink frequency point and then determines a transmitting frequency of each uplink signal based on the downlink receiving frequency for the first downlink signal in combination with a frequency shift between the uplink and the downlink.

The above-mentioned frequency shift between the uplink and the downlink may be defined in a protocol, configured by the network device through signaling, or determined based on frequency indication information about the uplink and/or downlink of the network device.

In an embodiment, the UE determines a downlink receiving frequency according to each first downlink signal and then determines, using the downlink receiving frequency, a transmitting frequency of an uplink signal corresponding to each first downlink signal.

In an embodiment, the transmitting frequency of an uplink signal is determined according to a frequency obtained by adding the frequency shift between the uplink and the downlink to the downlink receiving frequency for the first downlink signal associated with the uplink signal.

Step 102: transmitting the uplink signal based on the transmitting frequency of the uplink signal.

After determining the transmitting frequency of the uplink signal associated with the first downlink signal, the UE can transmit the corresponding uplink signal to TRP based on the transmitting frequency, and transmit the uplink signal using different transmitting frequencies. The TRP may receive the uplink signal transmitted by the UE and associated with the first downlink signal transmitted by the TRP previously, determine frequency shift based on the uplink signal, perform frequency pre-compensation, and transmit a subsequent second downlink signal to the UE based on the pre-compensated transmitting frequency.

In the present embodiment of the present application, the UE may respectively determine transmitting frequencies (frequency points) of the uplink signals which will be transmitted to transmission and reception points according to the first downlink signal transmitted by transmission and reception points and transmit each uplink signal using the transmitting frequency. The transmission and reception points can obtain Doppler shifts of the terminal relative to TRPs themselves, and frequency pre-compensation can be performed at the transmission and reception points to eliminate the Doppler shift and Doppler spread of the terminal side.

It should be noted that the “first downlink signal” and “second downlink signal” described in the embodiments of the present application are used to distinguish the downlink signals transmitted by the same TRP to the UE twice in succession. The first downlink signal may be downlink signal transmitted to the UE for the first time. Based on the first downlink signal, the UE can not only determine uplink signal associated with the first downlink signal, but also determine the transmitting frequency used to transmit the uplink signal to the TRP. The second downlink signal may be downlink signal transmitted by TRP on which frequency pre-compensation are performed, which can reduce the error in channel estimation and improve the performance of downlink transmission. It is noted that the first downlink signal and the second downlink signal may be different signals, or may be the same signal which is transmitted twice. For example, when the UE transmits one tracking reference signal (TRS) for the first time for the transmission of the uplink signal described in the present application, the TRS is the first downlink signal; and the TRS on which frequency pre-compensation is performed is the second downlink signal when the UE transmits the TRS for the second time.

In the method according to present embodiment of the present application, the terminal determines a corresponding downlink receiving frequency for each received first downlink signal, and determines a transmitting frequency of the uplink signal based on the corresponding downlink receiving frequency. Each first downlink signal and each uplink signal have a preset association respectively, and each transmission and reception point can independently perform frequency shift estimation and pre-compensation. The error of channel estimation is reduced and the performance of downlink transmission is improved since the downlink Doppler shift is pre-compensated at each transmission and reception point.

In the above embodiment, the association between the first downlink signal and the uplink signal includes one or more of the following:

- one or more channel properties and/or spatial transmitter (Tx) parameters of the uplink signal may be inferred from one or more channel properties and/or spatial transmitter (Tx) parameters of the first downlink signal, and
- a receiving terminal of the uplink signal and a transmitting terminal of the first downlink signal are the same network device, for example, the receiving terminal of the uplink signal is quasi co-located (QCL) with the transmitting terminal of the first downlink signal.

Based on the above-mentioned association between the downlink signal and the uplink signal, some properties of the channel experienced by the target signal may be obtained based on source signal; or, the spatial Tx parameters of the target signal may be obtained based on the spatial receiver (Rx) parameters of the source signal.

The association is QCL, and a type of the association includes one or more of:

- Type 1 ('QCL-Type A'): {Doppler shift, Doppler spread, average delay, delay spread};
- Type 2 ('QCL-Type B'): {Doppler shift, Doppler spread};
- Type 3 ('QCL-Type C'): {Doppler shift, average delay};
- Type 4 (e.g. 'QCL-Type E', etc.): {Spatial Rx parameter} or {Spatial Relation Inofo}, where the spatial Tx parameters of the target signal may be obtained through the spatial Rx parameters of the source signal;
- Type 5 (e.g. 'QCL-Type F' etc.): {Doppler shift};
- Type 6: Frequency relation information, where the transmitting frequency of the target signal is determined according to the source signal, or
- Type 7: a new QCL type including Doppler shift.

Some possible types of the association between uplink signal and downlink signal are shown in Table 1 below. The association may include one or more associations in the Table 1. When multiple types are included, it can be one of the combinations of Types 1/2/3/5/6+Type 4.

TABLE 1

| Types | First downlink signal | Uplink signal |
|---|---|---|
| Type 1 ('QCL-Type A'): Doppler shift, Doppler spread, average delay, delay spread | SSB(SS/PBCH block)/TRS | SRS |
| Type 2 ('QCL-Type B'): Doppler shift, Doppler spread | SSB(SS/PBCH block)/TRS | SRS |
| Type 5 ({Doppler Shift}): Doppler shift | SSB(SS/PBCH block)/TRS | SRS |
| Type 3 ('QCL-Type C'): Doppler shift, average delay | SSB(SS/PBCH block)/TRS | SRS |
| Type 6: Frequency relation information | SSB(SS/PBCH block)/TRS | SRS |
| Type 4: Spatial Relation Inofo or spatial Rx parameters | SSB(SS/PBCH block)/TRS/ NZP-CSI RS | SRS |
| Type 1 ('QCL-Type A'): Doppler shift, Doppler spread, average delay, delay spread | SSB(SS/PBCH block)/TRS | RACH |
| Type 2 ('QCL-Type B'): Doppler shift, Doppler spread | SSB(SS/PBCH block)/TRS | RACH |
| Type 5 ({Doppler Shift}): Doppler shift | SSB(SS/PBCH block)/TRS | RACH |
| Type 3 ('QCL-Type C'): Doppler shift, average delay | SSB(SS/PBCH block)/TRS | RACH |
| Type 6: Frequency relation information | SSB(SS/PBCH block)/TRS | RACH |
| Type 4: Spatial Relation Inofo or spatial Rx parameters | SSB(SS/PBCH block)/TRS/ NZP-CSI RS | RACH |

In an embodiment, when the association includes type 1, the UE determines the Doppler shift, Doppler spread, average delay and delay spread of the uplink signal according to the first downlink signal; when the association includes type 2, the UE determines the Doppler shift and Doppler spread of the uplink signal according to the first downlink signal; when the association includes type 3, the UE determines the Doppler shift and average delay of the uplink signal according to the first downlink signal; when the association includes type 4, the UE determines transmission beam of the uplink signal according to the downlink signal; when the association includes type 4, the UE uses a receive spatial filter of the downlink signal as a transmit spatial filter of the uplink signal; when the association includes type 5, the UE determines the Doppler shift of the uplink signal according to the first downlink signal; and when the association includes type 6, the UE determines the frequency relation information on the uplink signal according to the first downlink signal, and so on.

It should be noted that the association may not be indicated by the QCL type, but by other indications, and as long as the functions of the association proposed in the present application can be realized, the other indications are included in the embodiments of the present application.

As described in the above embodiments, in an embodiment, the uplink signal includes, but not limited to, one or more of the following: a sounding reference signal (SRS), a random access channel (RACH), a physical uplink shared channel (PUSCH), a physical uplink control channel (PUCCH), a demodulation reference signal (DMRS) corresponding to PUSCH, or a DMRS corresponding to PUCCH.

In an embodiment, the first downlink signal includes, but not limited to, one or more of the following: a synchronization signal block (SSB), a tracking reference signal (TRS) or a non-zero power (NZP)-channel state information reference signal (CSI RS).

In an embodiment, it can be determined whether a downlink signal transmitted by the network side is the first downlink signal by one or more of the following:

- the indication information at the network side, for example, the network side may directly indicate which signal is the first downlink signal, that is, the first downlink signal is determined based on the association indicated by the network side,
- the configuration information for the first downlink signal, for example, the first downlink signal may be directly indicated in the configuration parameters of the downlink signal, and
- a type of the downlink signal, for example, all synchronization signal blocks (SSBs) are considered to be the first downlink signal, or all tracking reference signals (TRSs) are considered to be the first downlink signal, or by a protocol, the downlink signal with certain sequences are used as the first downlink signal, or by a protocol, the downlink signal with certain properties are used as the first downlink signal, and so on.

In an embodiment, the uplink signal further determines the Doppler shift, Doppler spread, average delay, delay spread, transmission beam, etc. of the uplink signal according to the first downlink signal.

How the network side configures or indicates the association to the UE is described in combination with the following embodiments by the following schemes.

Scheme 1: the network side indicates the association to the UE through special signaling. In an embodiment, the signaling is in an uplink configuration (e.g., uplink-config). The association is indicated by transmission configuration indicator (TCI) signaling. For example, TCI signaling is configured in the uplink configuration.

In an embodiment, the association is included in the configuration information for the uplink signal or trigger information for the uplink signal. That is, the network side indicates the association through the configuration information for the uplink signal or trigger information for the uplink signal. Accordingly, the UE determines the association according to the configuration information for the uplink signal or the trigger information for the uplink signal. In an embodiment, the configuration information for the uplink signal is transmitted through a radio resource control (RRC) signaling. In an embodiment, the configuration information for the uplink signal is transmitted through a medium access control-control element (MAC-CE) signaling. In an embodiment, the trigger information for the uplink signal is indicated by downlink control information (DCI) signaling.

In an embodiment, the configuration information for the uplink signal or trigger information for the uplink signal includes multiple information of the first downlink signal associated with the uplink signal. That is, there are multiple first downlink signals associated with the uplink signal under being indicated by the configuration information for the uplink signal or trigger information for the uplink signal. For example, the configuration information for the uplink signal includes the configuration information on multiple/multiple groups of TCI-states, the network side further indicates an active TCI-state to the UE, and the UE determines the type of the association and the first downlink signal associated with the uplink signal according to the active TCI-state. And after receiving the first downlink signal activated by the activation signal transmitted by the network side, the UE transmits the uplink signal to the network side. In one embodiment, the configuration information for the uplink signal or trigger information for the uplink signal includes multiple information of the first downlink signal associated with the uplink signal. That is, there are multiple first downlink signals associated with the uplink signal under being indicated by the configuration information for the uplink signal or trigger information for the uplink signal. The association is associated with a trigger state and the association is determined according to the trigger state when the uplink signal is triggered. The configuration information for the uplink signal includes the configuration information on multiple/multiple groups of TCI-states, and each association is associated with one trigger state each association is associated with one trigger state and is indicated by the TCI-state. The UE can obtain the type of the association and information on the first downlink signal associated with the uplink signal according to the trigger state when the uplink signal is triggered.

As an example, the configuration of the TCI-state is:

```
TCI-State ::=          SEQUENCE {
  tci-StateId          TCI-StateId,
  qcl-Type1              QCL-Info,
  qcl-Type2              QCL-Info     OPTIONAL,   -- Need R
  ...
}
QCL-Info ::=       SEQUENCE {
  cell            ServCellIndex        OPTIONAL,   -- Need R
  bwp-Id            BWP-Id          OPTIONAL, -- Cond CSI-RS-Indicated
  referenceSignal  CHOICE {
    csi-rs          NZP-CSI-RS-ResourceId,
    ssb           SSB-Index
  },
  qcl-Type         ENUMERATED {typeA, typeB, typeC, typeD},
  ...
}
```

Where, tci-StateId represents identifiers of the TCI-state, qcl-Type1 and qcl-Type2 represent types of QCL, and referenceSignal represents the first downlink signal associated with the uplink signal. In one embodiment, the configuration information for the uplink signal or trigger information for the uplink signal further includes identifier information, and the identifier information is used for indicating a position of a resource corresponding to the first downlink signal in a resource set in which the resource corresponding to the first downlink signal is present, where the first downlink signal is associated with the uplink signal. In one embodiment, multiple first downlink signals correspond to the same resource set, and the network side carries identifier information through the configuration information for the uplink signal or trigger information for the uplink signal, and the identifier information is used for indicating that which downlink signal corresponding to the resource set has the association with the uplink signal, and the UE determines the first downlink signal corresponding to the resource set based on the location indicated by the identifier information.

Scheme 2: the association between the uplink signal and the first downlink signal is implicitly indicated.

In an embodiment, the configuration information for the uplink signal or trigger information for the uplink signal and the first downlink signal includes identifier information for indicating the association. For example, the configuration/trigger information for the uplink signal and the first downlink signal includes identifier information, and it is indicated that the uplink signal is associated with the first downlink signal when the identifier information on both are the same. In an embodiment, the type of association is pre-defined (e.g., defined by a protocol), or the configuration information for the first downlink signal or trigger information for the first downlink signal includes identifier information, all uplink signals correspond to a same resource set, and each uplink signal corresponding to the resource set is in one-to-one correspondence with the identifier information. In one embodiment, the configuration/trigger information on the first downlink signal includes specific identifier information, the uplink signals corresponding to all TRPs correspond to the same resource set, each uplink signal corresponding to the resource set is in one-to-one correspondence with each TRP corresponding to the identifier information according to a predefined association and the corresponding uplink signal can be determined according to the identifier information, or the first downlink signal and the uplink signal respectively correspond to different resource sets, and one-to-one correspondences are predefined between an uplink resource and a first downlink resource included in different resource sets. In one embodiment, all the first downlink signals correspond to the same resource set type, all the uplink signals correspond to the same resource set type, and the type of the uplink signal and the type of the first downlink signal may be the same or different. One-to-one correspondences are predefined between the uplink resources and the downlink resources included in these resource set types and the association between the uplink signal and the first downlink signal can be determined according to the one-to-one correspondence.

Scheme 3: the association is included in the configuration information for the first downlink signal or trigger information for the first downlink signal. For example, the network side indicates the UE through the configuration information for the first downlink signal or trigger information for the first downlink signal and accordingly, the UE determines the association according to the configuration information for the first downlink signal or trigger information for the first downlink signal.

In an embodiment, the configuration information for the first downlink signal includes multiple information of an uplink signal associated with the first downlink signal. For example, there are multiple uplink signals associated with the first downlink signal under being indicated by the configuration information for the first downlink signal or trigger information for the first downlink signal. In an embodiment, the UE may directly determine the uplink signal associated with the first downlink signal according to the configuration information. The UE may also determine the uplink signal associated with the first downlink signal according to an activation signal transmitted by the network side. In one embodiment, the network side further indicates active configuration information to the UE, and the UE determines the type of association and the uplink signals associated with the first downlink signal according to the active configuration information.

In an embodiment, the configuration information for the first downlink signal includes multiple information of an uplink signal associated with the first downlink signal. For example, there are multiple uplink signals associated with the first downlink signal under being indicated by the configuration information for the first downlink signal or trigger information for the first downlink signal. The association is associated with a trigger state. The association is determined according to the trigger state when the first downlink signal is triggered. In one embodiment, the configuration information for the first downlink signal includes the configuration information on multiple/multiple groups of TCI-states, each association is associated with one trigger state, and is indicated by TCI-state. The UE can obtain the type of the association and information on the uplink signals associated with the first downlink signal according to the trigger state when the first downlink signal is triggered.

In an embodiment, the configuration information for the first downlink signal or trigger information for the first downlink signal further includes identifier information, and the identifier information is used for indicating a position of a resource corresponding to the uplink signal associated with the first downlink signal in a resource set in which the resource corresponding to the uplink signal is present.

In the above embodiments, both the uplink signal and the first downlink signal are aperiodic signals, and a trigger signaling for the uplink signal simultaneously triggers the first downlink signal associated therewith, and a trigger signaling for the first downlink signal simultaneously triggers the uplink signal associated therewith.

In an embodiment, the triggering manner is applicable to all types of association. In an embodiment, the triggering manner is only applicable to a specific type of association.

On the basis of the foregoing embodiments, the UE transmits the uplink signals based on the transmitting frequency of the uplink signal includes one or more of the following:

- uplink signals are allocated on different time domain resources, for example, all the uplink signals are transmitted by time division multiplexing; In one embodiment, uplink signals corresponding to different TRPs are allocated on different time domain resources of same frequency domain resource, for example, different symbols, different time slots, different REs, and so on, which will occupy more time domain resources although it can avoid inter-subcarrier interference caused by multiple uplink signals with inconsistent transmitting frequency points,
- the uplink signals are allocated on different frequency domain resources, and a guard interval exists between different uplink signals, for example, the uplink signals are transmitted by frequency division multiplexing, and a guard interval exists between different uplink signals, In one embodiment, uplink signals corresponding to different TRPs are allocated on different frequency domain resources of the same time domain resource, and a guard interval exists between the uplink signals, and the guard interval may be at the subcarrier level, the PRB level, or the like, which can not only save time domain resource, but also avoid inter-subcarrier interference caused by multiple uplink signals with inconsistent transmitting frequency points; or
- the uplink signals are not transmitted simultaneously with an uplink signal for other purposes.

By the method according to the present embodiment of the present application, the terminal determines a corresponding downlink receiving frequency for each received first downlink signal, and determines transmitting frequency of the uplink signal based on the corresponding downlink receiving frequency. Each first downlink signal and each uplink signal have a preset association respectively, and each transmission and reception point can independently perform shift estimation and pre-compensation. The signal from each transmission and reception point is a signal after compensating Doppler shift since the downlink Doppler shift has been pre-compensated at each transmission and reception point. In the case of no error, the Doppler shift is completely compensated, and all the signals received by the UE and transmitted by the transmission and reception point have no Doppler shift, which reduces the error of channel estimation and improves the downlink transmission performance.

Figure 2:
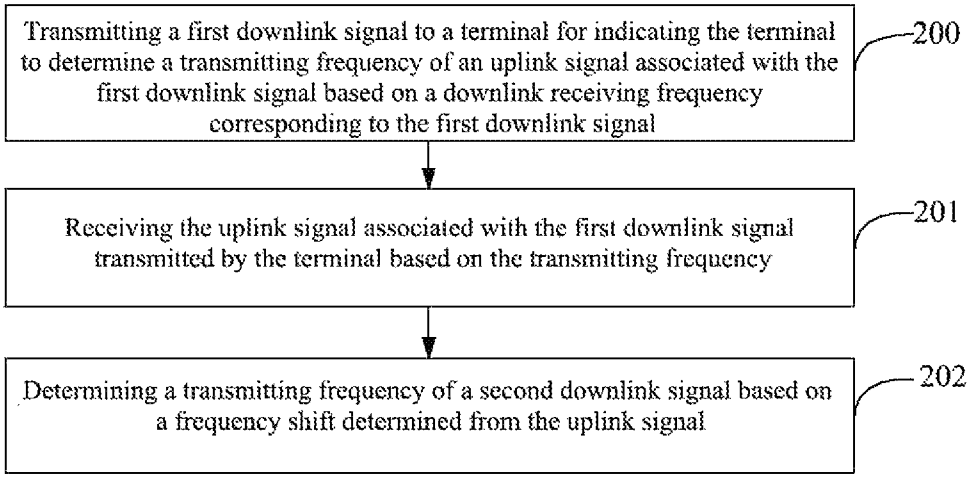
FIG. 2 is a schematic flowchart of a method for transmitting signals according to another embodiment of the present application.

FIG. 2 is a schematic flowchart of a method for transmitting signals according to another embodiment of the present application. As shown in FIG. 2, the method may be performed by a network device such as a TRP or a TRP group and will be described by taking TRP as an example. The method at least includes the following steps.

step 200: transmitting a first downlink signal to a terminal for indicating the terminal to determine a transmitting frequency of an uplink signal associated with the first downlink signal based on a downlink receiving frequency corresponding to the first downlink signal.

In the HST-SFN occasion, the UE receives a first downlink signal transmitted by multiple transmission and reception points (TRPs) respectively. For example, in the HST- SFN occasion, there are multiple transmission and reception points (TRPs), and each TRP will transmit its first downlink signal to an UE entering the HST-SFN occasion. In order to solve the problem in the related art that the TRP cannot estimate the Doppler shift experienced by the downlink or uplink signal, and thus the pre-compensation of the Doppler shift cannot be effectively performed, the first downlink signal transmitted to the UE by every TRP in the method according to the embodiment of the present application has association with an uplink signal, and the UE transmits the uplink signal based on the association.

After receiving multiple first downlink signals transmitted by TRP, the UE may first determine the downlink receiving frequency corresponding to each of the multiple first downlink signals. The downlink receiving frequency mentioned in the embodiment of the present application refers to a receiving frequency at which the UE receives the first downlink signal. The schemes by which the UE determines the transmitting frequency of the uplink signal associated with the first downlink signal according to the downlink receiving frequency corresponding to the first downlink signal may be various, which are the same as those of the above mentioned embodiments and not repeated here.

Step 201: receiving the uplink signal associated with the first downlink signal transmitted by the terminal based on the transmitting frequency; and step 202: determining the transmitting frequency of second downlink signal based on a frequency shift determined from the uplink signal.

After determining a transmitting frequency of an uplink signal associated with each first downlink signal, the UE can transmit the corresponding uplink signal to each TRP based on the transmitting frequency, and different uplink signals may be transmitted with different transmitting frequencies.

Each TRP may receive the uplink signal transmitted by the UE and associated with the first downlink signal transmitted by itself previously, and determine a frequency shift based on the uplink signal to perform frequency pre-compensation, and transmit subsequent second downlink signal to the UE based on the pre-compensated transmitting frequency.

In an embodiment, the network side includes multiple TRPs, and TRPs transmit different first downlink signals respectively. Each TRP determines a frequency shift based on the uplink signal associated with the first downlink signal transmitted by itself, and determine a transmitting frequency of a second downlink signal to be transmitted by itself using the frequency shift.

In an embodiment, the network side includes multiple TRPs, and the multiple TRPs are grouped. Each TRP group includes one or more TRPs. The TRP groups transmit different first downlink signals respectively (one or more TRPs in each TRP group may transmit the first downlink signal). Each TRP group determines corresponding frequency shift based on the uplink signal associated with the first downlink signal transmitted by itself, and determine the transmitting frequency of the second downlink signal to be transmitted by the TRP using the frequency shift.

In the embodiment of the present application, the UE may respectively determine a transmitting frequency (and/or frequency point) of the uplink signal which will be transmitted to transmission and reception points according to the first downlink signal transmitted by transmission and reception points, and transmit the uplink signal using the transmitting frequency, respectively, and the transmission and reception points may obtain the Doppler shifts of the terminal relative to TRPs themselves, and frequency pre-compensation can be performed at each transmission and reception point to eliminate the Doppler shift and Doppler spread at the terminal side.

It should be noted that the "first downlink signal" and "second downlink signal" described in the embodiments of the present application are used to distinguish the downlink signals transmitted by the same TRP to the UE twice in succession. The first downlink signal may be downlink signal transmitted to the UE for the first time. Based on the first downlink signal, the UE can not only determine uplink signal associated with the first downlink signal, but also determine the transmitting frequency used to transmit the uplink signal to the TRP. The second downlink signal may be downlink signal transmitted by TRP on which frequency pre-compensation are performed, which can reduce the error in channel estimation and improve the performance of downlink transmission. It is noted that the first downlink signal and the second downlink signal may be different signals, or may be the same signal which is transmitted twice. For example, when the UE transmits one tracking reference signal (TRS) for the first time for the transmission of the uplink signal described in the present application, the TRS is the first downlink signal; and the TRS on which frequency pre-compensation is performed is the second downlink signal when the UE transmits the TRS for the second time.

In the method according to present embodiment of the present application, the terminal determines a corresponding downlink receiving frequency for each received first downlink signal, and determines transmitting frequency of the uplink signal based on the corresponding downlink receiving frequency. Each first downlink signal and each uplink signal have a preset association respectively, and each transmission and reception point can independently perform frequency shift estimation and pre-compensation. The error of channel estimation is reduced and the performance of downlink transmission is improved since the downlink Doppler shift is pre-compensated at each transmission and reception point.

On the basis of the above embodiment, the network side configures or indicates the association between the uplink signal and the downlink signal, and thus the terminal can determine the transmitting frequency (and/or frequency point) of the uplink signal according to the downlink signal. Mode in which the terminal determines the transmitting frequency of the uplink signal according to the downlink signal is as follows: according to a downlink signal, the terminal determines its corresponding downlink frequency (and/or frequency point), and then determines an uplink frequency (and/or frequency point) of an uplink signal based on the downlink frequency and a difference between the downlink frequency and the uplink frequency. For example, when the downlink frequency point determined based on the terminal is $f_{DL}$, and the difference between the uplink frequency and downlink frequency is that the uplink frequency point is greater than the downlink frequency point by $f_d$, the uplink frequency may be determined to be $f_{DL}+f_d$.

In the present embodiment, the steps of configuring, by the TRP, the association and transmitting the first downlink signal to the UE may be performed in any order. According to the configured or indicated association, the UE determines, using the detected first downlink signals, transmitting frequency (for example, frequency point) of the uplink signal associated with the detected first downlink signal, and the UE transmits the uplink signal at the transmitting frequency according to the configuration or indication of the uplink signal. Each TRP receives uplink signal corresponding to it respectively, determines a frequency shift using the uplink signal corresponding to it and further determines a transmitting frequency of the subsequent downlink signal using the frequency shift (for example, performs frequency pre-compensation for the transmission of the downlink signal). The uplink signal corresponding to the TRP refers to an uplink signal associated with the downlink signal transmitted by the TRP.

In the above embodiment, the step 202 may include:

step 2021: determining a frequency adjustment value of subsequent downlink signal based on the frequency shift; and step 2022: determining a transmitting frequency of the subsequent downlink signal (a second downlink signal) using the frequency adjustment value.

A mode by which the TRP determines the frequency shift according to the uplink signal corresponding to it is: the TRP receives the uplink signal corresponding to it, performs frequency shift estimation, and obtains the frequency shift value for pre-compensation using frequency shift estimation value.

In an embodiment, the pre-compensated frequency shift value for a subsequent downlink signal transmitted by a TRP is equal to a function of a frequency shift estimation value obtained by the TRP using the uplink signal associated with the first downlink signal transmitted by the TRP. For example, the pre-compensated frequency shift value for the subsequent downlink signal transmitted by a TRP is equal to a frequency shift estimation value obtained by the TRP using the uplink signal associated with the first downlink signal transmitted by the TRP. For example, the pre-compensated frequency shift value for the subsequent downlink signal transmitted by a TRP is equal to a negative value of a frequency shift estimation value obtained by the TRP using the uplink signal associated with the first downlink signal transmitted by the TRP. For example, the pre-compensated frequency shift value for the subsequent downlink signal transmitted by a TRP is equal to a half of a frequency shift estimation value obtained by the TRP using the uplink signal associated with the first downlink signal transmitted by the TRP. For example, the pre-compensated frequency shift value for the subsequent downlink signal transmitted by a TRP is equal to a negative value of a half of a frequency shift estimation value obtained by the TRP using the uplink signal associated with the first downlink signal transmitted by the TRP.

In an embodiment, there are multiple TRPs in the network side, these TRPs are grouped, and the pre-compensated frequency shift value for a subsequent downlink signal transmitted by a TRP of all TRPs within a TRP group is equal to a function of a frequency shift estimation value obtained by the TRP group using the uplink signal associated with the first downlink signal transmitted by the TRP group. For example, the pre-compensated frequency shift value for the subsequent downlink signal transmitted by all TRPs within a TRP group is equal to a frequency shift estimation value obtained by the TRP group using the uplink signal associated with the first downlink signal transmitted by the TRP group. For example, the pre-compensated frequency shift value for the subsequent downlink signal transmitted by all TRPs within a TRP group is equal to a negative value of a frequency shift estimation value obtained by the TRP group using the uplink signal associated with the first downlink signal transmitted by the TRP group. For example, the pre-compensated frequency shift value for the subsequent downlink signal transmitted by all TRPs within a TRP group is equal to a half of a frequency shift estimation value obtained by the TRP group using the uplink signal associated with the first downlink signal transmitted by the TRP group. For example, the pre-compensated frequency shift value for the subsequent downlink signal transmitted by all TRPs within a TRP group is equal to a negative value of a half of a frequency shift estimation value obtained by the TRP group using the uplink signal associated with the first downlink signal transmitted by the TRP group.

In an embodiment, a mode by which the transmitting frequency of the subsequent downlink signal is determined using the frequency adjustment value is: a frequency point of the subsequent downlink signal (second downlink signal) is determined as a frequency point obtained by adding the frequency adjustment value at an original frequency point, and the transmitting frequency of the subsequent downlink signal is determined based on the frequency point.

In an embodiment, a mode by which the transmitting frequency of the subsequent downlink signal is determined using the frequency adjustment value is: a frequency point of the subsequent downlink signal (second downlink signal) is determined as a frequency point obtained by subtracting the frequency adjustment value from an original frequency point, and the transmitting frequency of the subsequent downlink signal is determined based on the frequency point.

In an embodiment, a mode by which the transmitting frequency of the subsequent downlink signal is determined using the frequency adjustment value is: the transmitting frequency of the subsequent downlink signal is determined as a transmitting frequency obtained by adding the frequency adjustment value at a frequency before being pre-compensated.

In an embodiment, a mode by which the transmitting frequency of the subsequent downlink signal is determined using the frequency adjustment value is: the transmitting frequency of the subsequent downlink signal is determined as a transmitting frequency obtained by subtracting the frequency adjustment value from a frequency before frequency pre-compensation.

In an embodiment, the transmitting frequency of the subsequent downlink signal is determined using the frequency adjustment value includes: a downlink frequency point corresponding to each TRP is determined as a frequency point obtained by adding the frequency adjustment value corresponding to each TRP at an original frequency point.

In an embodiment, the transmitting frequency of the subsequent downlink signal is determined using the frequency adjustment value includes: determining a downlink frequency corresponding to each TRP as a frequency point obtained by subtracting the frequency adjustment value corresponding to each TRP from an original frequency point.

In an embodiment, the transmitting frequency of the subsequent downlink signal is determined using the frequency adjustment value includes: a downlink frequency point corresponding to TRPs within a TRP group is determined as a frequency point obtained by adding the frequency adjustment value corresponding to the TRP group at an original frequency point of the TRP group.

In an embodiment, the transmitting frequency of the subsequent downlink signal is determined using the frequency adjustment value includes: a downlink frequency point corresponding to TRPs within a TRP group is determined as a frequency point obtained by subtracting the frequency adjustment value corresponding to each TRP from an original frequency point of each TRP.

In an embodiment, a mode by which the transmitting frequency of the subsequent downlink signal is determined using the frequency adjustment value is: each TRP determines the transmitting frequency of the subsequent downlink signal using the frequency adjustment value.

For example, the frequency shift estimation result is fa, the pre-compensated frequency shift value is $-f_{d/2}$, and algorithms for frequency shift estimation may be some frequency shift estimation algorithms in the related art. TRP pre-compensates the transmitting frequency of the second downlink signal using $-f_{d/2}$ and then there is only a small frequency shift when the UE receives the downlink signal. The above estimated frequency shift value is an estimation of a difference between the receiving frequency of the uplink signal and the actual uplink frequency point.

In an embodiment, the UE does not perform frequency pre-compensation on the first downlink signal used to determine the pre-compensated frequency shift. In this case, the TRP can always use the same method for determining a pre-compensated frequency shift.

In an embodiment, the TRP may use a method for determining the pre-compensated frequency shift when the UE accesses the current TRP for the first time and while may use another method for determining the pre-compensated frequency shift in the subsequent process. For example, the TRP may pre-compensate the transmitting frequency of the downlink signal using $-f_{d/2}$ if the frequency shift value estimated by the TRP is $f_d$ when the UE accesses the TRP for the first time; and while the TRP may pre-compensate the transmitting frequency of the downlink signal using $-f_{d'}$ if the frequency shift value estimated by the TRP is $f_{d'}$ when the pre-compensation frequency estimation is performed using the uplink signal in the subsequent process.

In the above embodiment, the association between the first downlink signal and the uplink signal includes one or more of the following:

- one or more channel properties and/or spatial Tx parameters of the uplink signal may be inferred from one or more channel properties and/or spatial transmitter (Tx) parameters of the first downlink signal, or
- a receiving terminal of the uplink signal and a transmitting terminal of the first downlink signal are the same network device, for example, the receiving terminal of the uplink signal is quasi co-located (QCL) with the transmitting terminal of the first downlink signal.

Based on the above-mentioned association between the downlink signal and the uplink signal, in an embodiment, some properties of the channel experienced by the target signal may be obtained based on the source signal; or, the spatial Tx parameters of the target signal may be obtained based on the spatial Rx parameters of the source signal.

The association is a QCL, and a type of the association includes one or more of:

Type 1 ('QCL-Type A'): {Doppler shift, Doppler spread, average delay, delay spread};

Type 2 ('QCL-Type B'): {Doppler shift, Doppler spread};

Type 3 ('QCL-Type C'): {Doppler shift, average delay};

Type 4 (e.g. 'QCL-Type E', etc.): {Spatial Rx parameter} or {Spatial Relation Inofo}, where the spatial Tx parameters of the target signal may be obtained through the spatial Rx parameters of the source signal;

Type 5 (e.g. 'QCL-TypeF' etc.): {Doppler shift};

Type 6: Frequency relation information, where, the transmitting frequency of the target signal is determined according to the source signal, or Type 7: a new QCL type including Doppler shift.

Some possible types of the association between uplink signal and downlink signal are shown in Table 2 below. The association may include one or more associations in the Table 2. When multiple types are included, it can be one of the combinations of Types 1/2/3/5/6+Type 4:

TABLE 2

| Types | First downlink signals | Uplink signals |
|---|---|---|
| Type 1 ('QCL-Type A'): Doppler shift, Doppler spread, average delay, delay spread | SSB(SS/PBCH block)/TRS | SRS |
| Type 2 ('QCL-Type B'): Doppler shift, Doppler spread | SSB(SS/PBCH block)/TRS | SRS |
| Type 5 ({Doppler Shift}): Doppler shift | SSB(SS/PBCH block)/TRS | SRS |
| Type 3 ('QCL-Type C'): Doppler shift, average delay | SSB(SS/PBCH block)/TRS | SRS |
| Type 6: Frequency relation information | SSB(SS/PBCH block)/TRS | SRS |
| Type 4: Spatial Relation Inofo or spatial Rx parameters | SSB(SS/PBCH block)/TRS/ NZP-CSI RS | SRS |
| Type 1 ('QCL-Type A'): Doppler shift, Doppler spread, average delay, delay spread | SSB(SS/PBCH block)/TRS | RACH |
| Type 2 ('QCL-Type B'): Doppler shift, Doppler spread | SSB(SS/PBCH block)/TRS | RACH |
| Type 5 ({Doppler Shift}): Doppler shift | SSB(SS/PBCH block)/TRS | RACH |
| Type 3 ('QCL-Type C'): Doppler shift, average delay | SSB(SS/PBCH block)/TRS | RACH |
| Type 6: Frequency relation information | SSB(SS/PBCH block)/TRS | RACH |
| Type 4: Spatial Relation Inofo or spatial Rx parameters | SSB(SS/PBCH block)/TRS/ NZP-CSI RS | RACH |

In an embodiment, when the association includes type 1, the UE determines the Doppler shift, Doppler spread, average delay, and delay spread of the uplink signals according to the first downlink signal; when the association includes type 2, the UE determines the Doppler shift and Doppler spread of the uplink signals according to the first downlink signal; when the association includes type 3, the UE determines the Doppler shift and average delay of the uplink signals according to the first downlink signal; when the association includes type 4, the UE determines transmission beams of the uplink signals according to the downlink signals; when the association includes type 4, the UE uses a receive spatial filter of the downlink signals as a transmit spatial filter of the uplink signals; when the association includes type 5, the UE determines the Doppler shift of the uplink signals according to the first downlink signal; and when the association includes type 6, the UE determines the frequency relation information on the uplink signals according to the first downlink signal, and so on.

It should be noted that the association may not be indicated by the QCL type, but by other indications, and as long as the functions of the association proposed in the present application can be realized, the other indications are included in the embodiments of the present application.

As described in the above embodiments, in an embodiment, the uplink signal includes, but not limited to, one or more of the following: a sounding reference signal (SRS), a random access channel (RACH), a physical uplink shared channel (PUSCH), a physical uplink control channel (PUCCH), a demodulation reference signal (DMRS) corresponding to PUSCH, or a DMRS corresponding to PUCCH.

In an embodiment, the first downlink signal includes, but not limited to, one or more of the following: a synchronization signal block (SSB), a tracking reference signal (TRS) or a non-zero power (NZP)-channel state information reference signal (CSI RS).

In an embodiment, the network side may indicate the UE whether a downlink signal transmitted by the network side is the first downlink signal by one or more of the following:

the indication information at the network side, for example, the network side may directly indicate which signal is the first downlink signal, that is, the first downlink signal is determined based on the association indicated by the network side, the configuration information for the first downlink signal, for example, the first downlink signal may be directly indicated in the configuration parameters of the downlink signal, or the type of the downlink signal, for example, all synchronization signal blocks (SSBs) are considered to be the first downlink signal, or all tracking reference signals (TRSs) are considered to be the first downlink signal, or by a protocol, downlink signals with certain sequences are used as the first downlink signal, or by a protocol, downlink signals with certain properties are used as the first downlink signal, and so on.

In an embodiment, the uplink signal further determines the Doppler shift, Doppler spread, average delay, delay spread, transmission beam, etc. of the uplink signal according to the first downlink signal.

How the network side configures or indicates the association to the UE is described in combination with the following embodiments by the following schemes.

Scheme 1: the network side indicates the association to the UE through special signaling. In an embodiment, the signaling is in an uplink configuration (e.g., uplink-config). The association is indicated by transmission configuration indicator (TCI) signaling. For example, TCI signaling is configured in the uplink configuration.

In an embodiment, the association is included in the configuration information for the uplink signal or trigger information for the uplink signal. That is, the network side indicates the association through the configuration information for the uplink signal or trigger information for the uplink signal. Accordingly, the UE determines the association according to the configuration information for the uplink signal or the trigger information for the uplink signal. In an embodiment, the configuration information for the uplink signal is transmitted through a radio resource control (RRC) signaling. In an embodiment, the configuration information for the uplink signal is transmitted through a medium access control-control element (MAC-CE) signaling. In an embodiment, the trigger information for the uplink signal is indicated by downlink control information (DCI) signaling.

In an embodiment, the configuration information for the uplink signal or trigger information for the uplink signal includes multiple information of the first downlink signal associated with the uplink signal. That is, there are multiple first downlink signals associated with the uplink signal under being indicated by the configuration information for the uplink signal or trigger information for the uplink signal. For example, the configuration information for the uplink signal includes the configuration information on multiple/multiple groups of TCI-states, the network side further indicates an active TCI-state to the UE, and the UE determines the type of association and the first downlink signal associated with the uplink signal according to the active TCI-state. The network side transmits an activation signal for allowing the UE to determine the first downlink signal associated with the uplink signal, and after receiving the first downlink signal activated by the activation signal transmitted by the network side, the UE transmits the uplink signal to the network side.

In another embodiment, the configuration information for the uplink signal or trigger information for the uplink signal includes multiple information of the first downlink signal associated with the uplink signal. That is, there are multiple first downlink signals associated with the uplink signals under being indicated by the configuration information for the uplink signal or trigger information for the uplink signal. The association is associated with a trigger state, the network side transmits a trigger signal to trigger the uplink signal and the UE determines the association according to the trigger state. The configuration information for the uplink signal includes the configuration information on multiple/multiple groups of TCI-states, and each association is associated with one trigger state each association is associated with one trigger state and is indicated by the TCI-state. The UE can obtain the type of the association and information on the first downlink signal associated with the uplink signal according to the trigger state when the uplink signal is triggered.

In yet another embodiment, the configuration information for the uplink signal or trigger information for the uplink signal further includes identifier information, and the identifier information is used for indicating a position of a resource corresponding to the first downlink signal in a resource set in which the resource corresponding to the first downlink signal is present, where the first downlink signal is associated with the uplink signal. In one embodiment, multiple first downlink signals are stored in the same resource set, and the network side carries an identifier information through the configuration information for the uplink signal or trigger information for the uplink signal, and the identifier information is used for indicating that which downlink signal corresponding to the resource set is used to correlate with the uplink signal, and the UE determines the first downlink signal in the resource set based on the location indicated by the identifier information.

Scheme 2: the association between the uplink signal and the first downlink signal is implicitly indicated.

The configuration information for the uplink signal or trigger information for the uplink signal and the first downlink signal includes identifier information for indicating the association. For example, the configuration/trigger information for the uplink signal and the first downlink signal includes identifier information, and it is indicated that the uplink signal is associated with the first downlink signal when the identifier information on both are the same. In an embodiment, the type of association is pre-defined (e.g., defined by a protocol), or the configuration information for the first downlink signal or trigger information for the first downlink signal includes identifier information, all uplink signals correspond to a same resource set, and each uplink signal in the resource set is in one-to-one correspondence with the identifier information. In one embodiment, the configuration/trigger information on the first downlink signal includes specific identifier information, the uplink signals corresponding to all TRPs correspond to the same resource set, each uplink signal corresponding to the resource set is in one-to-one correspondence with each TRP corresponding to the identifier information according to a predefined association and the corresponding uplink signal can be determined according to the identifier information, or the first downlink signal and the uplink signal respectively correspond to different resource sets, and one-to-one correspondences are predefined between an uplink resource and a first downlink resource included in different resource sets. In one embodiment, all first downlink signals correspond to the same resource set type, all uplink signals correspond to the same resource set type, and the type of the uplink signal and the type of the first downlink signal may be the same or different. One-to-one correspondences are predefined between the uplink resources and the downlink resources included in these resource set types and the association between the uplink signal and the first downlink signal can be determined according to the one-to-one correspondence.

Scheme 3: the association is included in the configuration information for the first downlink signal or trigger information for the first downlink signal. For example, the network side indicates the UE through the configuration information for the first downlink signal or trigger information for the first downlink signal and accordingly, the UE determines the association according to the configuration information for the first downlink signal or trigger information for the first downlink signal.

In an embodiment, the configuration information for the first downlink signal includes multiple information of an uplink signal associated with the first downlink signal. For example, there are multiple uplink signals associated with the first downlink signal under being indicated by the configuration information for the first downlink signal or trigger information for the first downlink signal. In an embodiment, the UE may directly determine the uplink signal associated with the first downlink signal according to the configuration information.

In another embodiment, the network side transmits an activation signal for allowing the UE to determine the uplink signal associated with the first downlink signal and the UE may determine the uplink signal associated with the first downlink signal according to the activation signal transmitted by the network side. In one embodiment, the network side further indicates active configuration information to the UE, and the UE determines the type of the association and the uplink signals associated with the first downlink signal according to the active configuration information.

In yet another embodiment, the configuration information for the first downlink signal includes multiple information of an uplink signal associated with the first downlink signal. For example, there are multiple uplink signals associated with the first downlink signal under being indicated by the configuration information for the first downlink signal or trigger information for the first downlink signal. The association is associated with a trigger state. The network side transmits a trigger signal for triggering the first downlink signal and the UE determines the association according to the trigger state. In one embodiment, the configuration information for the first downlink signal includes the configuration information on multiple/multiple groups of TCI-states, each association is associated with one trigger state, and is indicated by TCI-state. The UE can obtain the type of the association and information on the uplink signals associated with the first downlink signal according to the trigger state when the first downlink signal is triggered.

In still yet another embodiment, the configuration information for the first downlink signal or trigger information for the first downlink signal further includes identifier information, and the identifier information is used for indicating a position of a resource corresponding to the uplink signal associated with the first downlink signal in a resource set in which the resource corresponding to the uplink signal is present.

In the above embodiments, both the uplink signal and the first downlink signal are aperiodic signals, and a trigger signaling for the uplink signal simultaneously triggers the first downlink signal associated therewith, and a trigger signaling for the first downlink signal simultaneously triggers the uplink signal associated therewith.

In an embodiment, the triggering manner is applicable to all types of association. In an embodiment, the triggering manner is only applicable to a specific type of association.

On the basis of the foregoing embodiments, the uplink signal is transmitted by any one of or a combination of the following:

uplink signals are allocated on different time domain resources; In one embodiment, uplink signals corresponding to different TRPs are allocated on different time domain resources of same frequency domain resource, for example, different symbols, different time slots, different REs, and so on, which will occupy more time domain resources although it can avoid inter-subcarrier interference caused by multiple uplink signals with inconsistent transmitting frequency points, the uplink signals are allocated on different frequency domain resources, and a guard interval exists between different uplink signals, In one embodiment, uplink signals corresponding to different TRPs are allocated on different frequency domain resources of the same time domain resource, and a guard interval exists between different uplink signals, and the guard interval may be at the subcarrier level, the PRB level, or the like, which can not only save time domain resource, but also avoid inter-subcarrier interference caused by multiple uplink signals with inconsistent transmitting frequency points; and the uplink signals are not transmitted simultaneously with an uplink signal for other purposes.

By the method according to the present embodiment of the present application, the terminal determines a corresponding downlink receiving frequency for each received first downlink signal, and determines transmitting frequency of each uplink signal based on the corresponding downlink receiving frequency. Each first downlink signal and each uplink signal have a preset association respectively, and each transmission and reception point can independently perform shift estimation and pre-compensation. The signal from each transmission and reception point is a signal after compensating Doppler shift since the downlink Doppler shift has been pre-compensated at each transmission and reception point. In the case of no error, the Doppler shift is completely compensated, and all the signals received by the UE and transmitted by the transmission and reception point have no Doppler shift, which reduces the error of channel estimation and improves the downlink transmission performance.

An example of a scheme for pre-compensating frequency by the base station according to an embodiment of the present application is described below.

A BBU is connected to 4 TRPs, specifically 4 RRHs. In accordance with the running direction of a train, the sequence of the train passing through these RRHs will be RRH1, RRH2, RRH3 and RRH4. Table 3 shows a frequency comparison table when downlink signals from the RRHs reach the UE before and after frequency pre-compensation is performed. It is assumed that the Doppler shift estimations at the RRHs and the terminal are ideal estimate, the unidirectional Doppler shifts of RRH1, RRH2, RRH3 and RRH4 are $f_1$, $f_2$, $f_3$ and $f_4$ respectively, and the pre-compensated value of the frequency is one-half of the Doppler shift determined based on the RRHs based on received uplink signals. In the embodiment of the present application, the Doppler shifts of the downlink signals received by the UE from RRHs can be eliminated, and the UE can obtain better downlink reception performance.

TABLE 3

Frequencies of downlink signals received by UE from RRHs before and after frequency pre-compensation is performed

| Frequencies of downlink signals from RRHs when no frequency pre-compensation is performed | | | | Uplink frequencies determined by the UE | | | | Frequencies at which uplink signals arrives at RRHs | | | |
|---|---|---|---|---|---|---|---|---|---|---|---|
| RRH 1 | RRH 2 | RRH 3 | RRH 4 | RRH 1 | RRH 2 | RRH 3 | RRH 4 | RRH 1 | RRH 2 | RRH 3 | RRH 4 |
| fDL + f1 | fDL + f2 | fDL + f3 | fDL + f4 | fUL1 | fUL2 | fUL3 | fUL4 | fUL1 + 2f1 | fUL2 + 2f2 | fUL3 + 2f3 | fUL4 + 2f4 |

| Frequencies pre-compensated by RRHs | | | | Frequencies of downlink signals from RRHs after performing frequency pre-compensation | | | |
|---|---|---|---|---|---|---|---|
| RRH 1 | RRH 2 | RRH 3 | RRH 4 | RRH 1 | RRH 2 | RRH 3 | RRH 4 |
| −f1 | −f2 | −f3 | −f4 | fDL | fDL | fDL | fDL |

Figure 3:
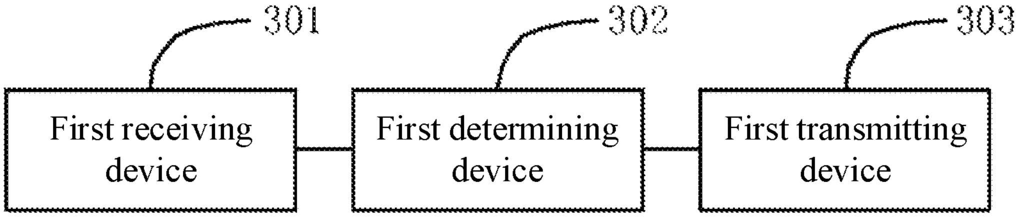
FIG. 3 is a schematic structural diagram of a terminal according to an embodiment of the present application.

FIG. 3 is a schematic structural diagram of a terminal according to an embodiment of the present application. As shown in FIG. 3, the terminal includes a first receiving device 301, a first determining device 302, and a first transmitting device 303, in which:

the first receiving device 301, configured to receive multiple first downlink signals;

the first determining device 302, configured to determine a downlink receiving frequency corresponding to each of the multiple first downlink signals, and determine a transmitting frequency of an uplink signal associated with the first downlink signal based on the downlink receiving frequency, and the first transmitting device 303, configured to transmit the uplink signal based on the transmitting frequency of the uplink signal, where a frequency shift determined based on the uplink signal associated with the first downlink signal is used to determine a transmitting frequency of a second downlink signal.

In present embodiment of the present application, the terminal determines a corresponding downlink receiving frequency for each received first downlink signal, and determines transmitting frequency of each uplink signal based on the corresponding downlink receiving frequency. Each first downlink signal and each uplink signal have a preset association, and each transmission and reception point can independently perform shift estimation and pre-compensation. The signal from each transmission and reception point is a signal after compensating Doppler shift since the downlink Doppler shift has been pre-compensated at each transmission and reception point. In the case of no error, the Doppler shift is completely compensated, and all the signals received by the UE and transmitted by the transmission and reception point have no Doppler shift, which reduces the error of channel estimation and improves the downlink transmission performance.

Figure 4:
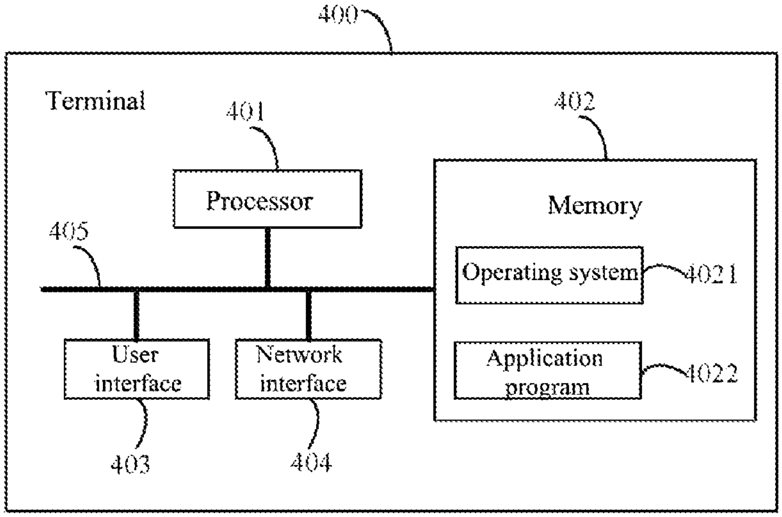
FIG. 4 is a schematic structural diagram of a terminal according to another embodiment of the present application.

FIG. 4 is a schematic structural diagram of a terminal according to another embodiment of the present application. As shown in FIG. 4, the terminal 400 may include: at least one processor 401, a memory 402, at least one network interface 404 and other user interfaces 403. Various components in the terminal 400 are coupled together by bus system 405. It should be noted that the bus system 405 is used to implement the connection and communication between these components. In addition to a data bus, the bus system 405 further includes a power bus, a control bus, and a status signal bus. However, for clarity of illustration, the various buses are labeled as bus system 405 in FIG. 4.

The user interface 403 may include a display, a keyboard or a pointing device, such as a mouse, a trackball, a touch pad or a touch screen, and the like.

It should be noted that the memory 402 in present embodiment of the present application may be a volatile memory or a non-volatile memory, or may include both volatile and non-volatile memories. The non-volatile memory may be read-only memory (ROM), programmable read-only memory (PROM), erasable programmable read-only memory (EPROM), electrically erasable programmable read-only memory (EEPROM) or flash memory. The volatile memory may be random access memory (RAM), which is used as an external cache. By a way of example and not limitation, many forms of RAM, such as static RAM (SRAM), dynamic RAM (DRAM), synchronous DRAM (SDRAM), double data rate synchronous dynamic random access memory (DDRSDRAM), enhanced synchronous dynamic random access memory (ESDRAM), synchlink dynamic random access memory (SLDRAM) and direct memory bus random access memory (DRRAM) may be used. The memory 402 of the systems and methods described in various embodiments of the present application is intended to include, but not limited to, these and any other used types of memories.

In some embodiments, the memory 402 stores executable modules or data structures, or a subset thereof, or an extended set thereof, such as an operating system 4021 and an application program 4022.

The operating system 4021 includes various system programs, such as a framework layer, a core library layer, a driver layer, etc., for implementing various basic services and processing hardware-based tasks. The application program 4022 includes various application programs, such as a media player, a browser, etc., for implementing various application services. The program for implementing the method of the embodiment of the present application may be included in The application program 4022.

In present embodiment of the present application, by calling the computer program or instruction stored in the memory 402, for example, the computer program or instruction stored in The application program 4022, the computer program or instruction causes the processor 401 to implement the following steps:

receiving multiple first downlink signals;

determining a downlink receiving frequency corresponding to each of the multiple first downlink signals, and determining a transmitting frequency of an uplink signal associated with the first downlink signal based on the downlink receiving frequency corresponding to the first downlink signal, and transmitting the uplink signal based on the transmitting frequency of the uplink signal, where a frequency shift determined based on the uplink signal associated with the first downlink signal is used to determine a transmitting frequency of a second downlink signal.

The methods disclosed in the above embodiments of the present application may be applied to the processor 401 or implemented by the processor 401. The processor 401 may be an integrated circuit chip with signal processing capability. In the implementation process, each step of the above-mentioned methods can be implemented by an integrated logic circuit of hardware in the processor 401 or an instruction in the form of software. The above-mentioned processor 401 may be a general-purpose processor, a digital signal processor (DSP), an application specific integrated circuit (ASIC), a field programmable gate array (FPGA) or other programmable logic devices, discrete gate or transistor logic devices, discrete hardware components capable of implementing or performing the methods, steps, and logic block diagrams disclosed in the embodiments of the present application. The general purpose processor may be a microprocessor or the processor may be any conventional processor or the like. The steps of the method disclosed in conjunction with the embodiments of the present application may be directly embodied as being executed by a hardware decoding processor, or executed by a combination of hardware and software modules in the decoding processor. The software modules may be located in random access memory, flash memory, read-only memory, programmable read-only memory or electrically erasable programmable memory, registers and other storage media in the related art. The storage medium is located in the memory 402, and the processor 401 reads the information in the memory 402, and completes the steps of the above method in combination with its hardware.

It should be noted that the embodiments described herein may be implemented by hardware, software, firmware, middleware, microcode, or a combination thereof. For hardware implementation, the processing unit may be implemented in one or more application specific integrated circuits (ASIC), digital signal processors (DSP), digital signal processing devices (DSPD), programmable logic devices (PLD), field-programmable gate arrays (FPGA), general purpose processors, controllers, microcontrollers, microprocessors and other electronic units or a combination thereof for performing the functions described in the present application.

For software implementation, the described technology may be implemented through modules (eg, procedures, functions, etc.) that perform the functions described in the embodiments of the present application. Software codes may be stored in memory and executed by a processor. The memory can be disposed inside the processor or outside the processor.

In one embodiment, as another embodiment, the association between the first downlink signal and the uplink signal includes one or more of the following:

one or more channel properties and/or spatial Tx parameters of the uplink signal may be inferred from one or more channel properties and/or spatial transmitter (Tx) parameters of the first downlink signal, and a receiving terminal of the uplink signal and a transmitting terminal of the first downlink signal are the same network device.

In one embodiment, as yet another embodiment, the association is quasi co-located (QCL), and a type of the association includes one or more of:

Type 1: {Doppler shift, Doppler spread, average delay, delay spread};

Type 2: {Doppler shift, Doppler spread};

Type 3: {Doppler shift, average delay};

Type 4: {Spatial Rx parameter} or {Spatial Relation Inofo};

Type 5: {Doppler shift};

Type 6: Frequency relation information; or

Type 7: a new QCL type containing Doppler shift.

In one embodiment, as still yet another embodiment, the association is indicated by configuration information for the uplink signal or trigger information for the uplink signal.

In one embodiment, as still yet another embodiment, the configuration information for the uplink signal or trigger information for the uplink signal includes multiple information of the first downlink signal associated with the uplink signal; accordingly, the processor is further used for performing: determining the first downlink signal associated with the uplink signal according to an activation signal transmitted by the network device, or further includes determining the association according to a trigger state when the uplink signals are triggered, where the association is associated with a trigger state, or the configuration information for the uplink signal or trigger information for the uplink signal further includes identifier information, and the identifier information is used for indicating a position of a resource corresponding to the first downlink signal in a resource set in which the resource corresponding to the first downlink signal is present, where the first downlink signal is associated with the uplink signal.

In one embodiment, as still yet another embodiment, the configuration information for the uplink signal or trigger information for the uplink signal and the first downlink signal includes identifier information for indicating the association, or the configuration information for the first downlink signal or trigger information for the first downlink signal includes identifier information, all uplink signals correspond to a same resource set, and each uplink signal corresponding to the resource set is in one-to-one correspondence with the identifier information, or the first downlink signal and the uplink signal respectively correspond to different resource sets, and one-to-one correspondences are predefined between an uplink resource and a first downlink resource included in different resource sets.

In one embodiment, as still yet another embodiment, the association is indicated by configuration information for the first downlink signal or the trigger information for the first downlink signal.

In one embodiment, as still yet another embodiment, the configuration information for the first downlink signal includes multiple information of an uplink signal associated with the first downlink signal; accordingly, the processor is further suitable for performing: determining the uplink signal associated with the first downlink signal according to an activation signal transmitted by the network device, or further used for: determining the association according to a trigger state when the first downlink signal is triggered, where the association is associated with a trigger state, or the configuration information for the first downlink signal or trigger information for the first downlink signal further includes identifier information, and the identifier information is used for indicating a position of a resource corresponding to the uplink signal associated with the first downlink signal in a resource set in which the resource corresponding to the uplink signal is present.

In one embodiment, as still yet another embodiment, the transmitting the uplink signal based on the transmitting frequency of the uplink signal includes one or more of the following:

uplink signals are allocated on different time domain resources;

the uplink signals are allocated on different frequency domain resources, and a guard interval exists between different uplink signals; or the uplink signals are not transmitted simultaneously with an uplink signal for other purposes.

In one embodiment, as still yet another embodiment, the uplink signal includes, but not limited to, one or more of the following: a sounding reference signal (SRS), a random access channel (RACH), a physical uplink shared channel (PUSCH), a physical uplink control channel (PUCCH), demodulation reference signal (DMRS) corresponding to PUSCH, or a DMRS corresponding to the PUCCH.

In one embodiment, as still yet another embodiment, the first downlink signal includes, but not limited to, one or more of the following: a synchronization signal block (SSB), a tracking reference signal (TRS) or a non-zero power (NZP)-channel state information reference signal (CSI RS).

As still yet another embodiment, it can be determined whether a downlink signal is the first downlink signal based on one or more of the following information:

indication information at the network side;

configuration information on the downlink signal; or the type of the downlink signal.

Figure 5:
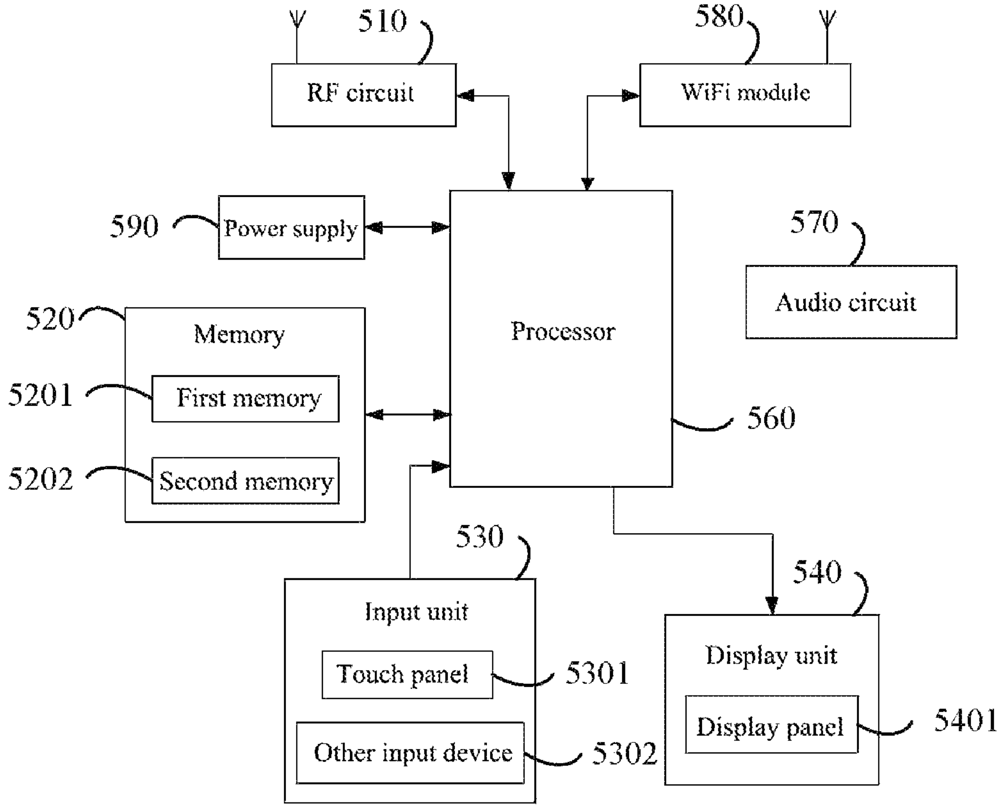
FIG. 5 is a schematic structural diagram of a terminal according to still another embodiment of the present application.

The terminal according to present embodiment of the present application can implement each process implemented by a terminal in the foregoing embodiments, and to avoid repetition, details are not described herein again FIG. 5 is a schematic structural diagram of a terminal according to another embodiment of the present application. The terminal may be a mobile phone, a tablet computer, a personal digital assistant (PDA), or an electronic reader, a handheld game console, a point of sale (POS), in-vehicle electronic equipment (an in-vehicle computer), etc. As shown in FIG. 5, the terminal includes a radio frequency (RF) circuit 510, a memory 520, an input unit 530, a display unit 540, a processor 560, an audio circuit 570, a WiFi (Wireless Fidelity) device 580 and a power supply 590. The structure of the terminal shown in FIG. 5 does not constitute a limitation on the terminal, and the structure of the terminal may include more or less components than those shown in the figure, or combine some components, or divide some components, or have different component arrangements.

The input unit 530 can be configured to receive numerical or character information input by the user, and generate signal input related to user setting and function control of the mobile terminal. In one embodiment, the input unit 530 in present embodiment of the present application may include a touch panel 5301. The touch panel 5301, also referred to as a touch screen, can collect the user's touch operations (such as the user's operations on the touch panel 5301 using any used objects or accessories such as a finger, a stylus, etc.) on or near it and drive the corresponding connection device through specified programs. In an embodiment, the touch panel 5301 may include a touch detection device and a touch controller in which the touch detection device detects the user's touch orientation, detects the signal brought by the touch operation, and transmits the signal to the touch controller; and the touch controller receives the touch information from the touch detection device, converts it into contact coordinates and transmits the contact coordinates to the processor 560, and can receive commands transmitted by the processor 560 and execute them. In addition, the touch panel 5301 can be realized in various types such as resistive, capacitive, infrared, and surface acoustic waves. In addition to the touch panel 5301, the input unit 530 may further include other input devices 5302, which may be used to receive input numerical or character information and generate key signal input related to user settings and function control of the mobile terminal. In one embodiment, other input devices 5302 may include, but not limited to, one or more of physical keyboards, function keys (such as volume control keys, switch keys, etc.), trackballs, a mouse, joysticks, an optical mouse (which is a touch-sensitive surface that do not display visual output, or an extension of a touch-sensitive surface formed by a touch screen).

The display unit 540 may be configured to display information input by the user or information provided to the user and various menu interfaces of the mobile terminal. The display unit 540 may include a display panel 5401. The display panel 5401 may be configured in the form of a liquid crystal display (LCD), an organic light-emitting diode (OLED), and the like.

It should be noted that the touch panel 5301 can cover the display panel 5401 to form a touch display screen. After a touch operation on or near the touch display screen is detected, it is transmitted to the processor 560 to determine the type of touch events, and the processor 560 provides corresponding visual output on the touch display screen according to the type of touch events.

The touch display screen includes an application interface display area and a common control display area. The arrangement of The application interface display area and the common control display area is not limited, and may be any arrangement that can distinguish the two display areas, such as up-down arrangement, left-right arrangement, or the like. The application interface display area can be used to display the interface of The applications. Each interface may contain at least one application icon and/or interface elements such as widget desktop control. The application interface display area can also be an empty interface that does not contain any content. The common control display area is used to display controls with high usage rate, such as setting buttons, interface numbers, scroll bars, phonebook icons and other application icons.

The RF circuit 510 can be used for receiving and transmitting signals during transmitting and receiving of information or during a call. In particular, after receiving the downlink information from the network side, the RF circuit 510 transmits the downlink information to the processor 560 for processing. In addition, the RF circuit 510 transmits data related to the uplink to the network side. Typically, the RF circuit 510 includes, but not limited to, an antenna, at least one amplifier, a transceiver, a coupler, a low noise amplifier (LNA), a duplexer, and the like. In addition, the RF circuitry 510 may also communicate with networks and other devices through wireless communication. The wireless communication can use any communication standard or protocol, including, but not limited to, global system of mobile communication (GSM), general packet radio service (GPRS), code division multiple access (CDMA), wideband codedivision multiple access (WCDMA), long term evolution (LTE), email, short messaging service (SMS) and the like.

The memory 520 is used to store software programs and modules, and the processor 560 executes various functional applications and data processing of the mobile terminal by running the software programs and modules stored in the memory 520. The memory 520 may mainly include a stored program area and a stored data area, in which the stored program area may store an operating system, an application required for at least one function (such as a sound playback function, an image playback function, etc.), and the like; and the stored data area may store data (such as audio data, phone book, etc.) created by the use of the mobile terminal. In addition, memory 520 may include high-speed random access memory, and may further include non-volatile memory, such as at least one magnetic disk storage device, flash memory device, or other volatile solid state storage device.

The processor 560 is a control center of the mobile terminal, is connected to various parts of the entire mobile terminal using various interfaces and lines, and performs various functions of the mobile terminal and processes data by running or executing the software programs and/or modules stored in a first memory 5201, and calling the data stored in a second memory 5202 to monitor the mobile terminal as a whole. In an embodiment, the processor 560 may include one or more processing units.

In present embodiment of the present application, the processor 560 is configured to receive, by calling the software programs and/or modules stored in the first memory 5201 and/or data stored in the second memory 5202, multiple first downlink signals, determine a downlink receiving frequency corresponding to each of the multiple first downlink signals, and determine a transmitting frequency of an uplink signal associated with the first downlink signal based on the downlink receiving frequency, and transmit the uplink signal based on the transmitting frequency of the uplink signal, where a frequency shift determined based on the uplink signal associated with the first downlink signal is used to determine a transmitting frequency of a second downlink signal.

The terminal provided by the present embodiment of the present application can implement each process implemented by the terminal in the foregoing embodiments, and to avoid repetition, details are not described herein again.

Figure 6:
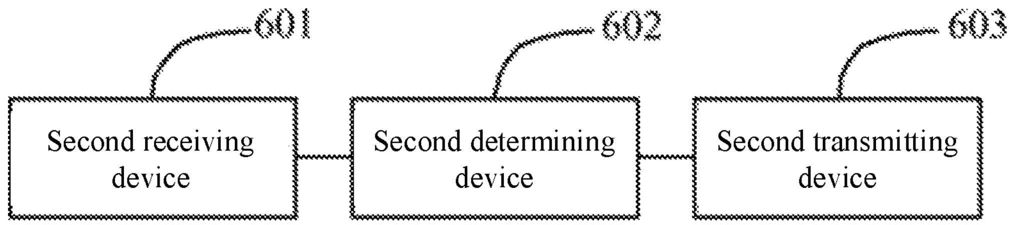
FIG. 6 is a schematic structural diagram of a network device according to an embodiment of the present application.

FIG. 6 is a schematic diagram of a network device according to an embodiment of the present application. As shown in FIG. 6, the network device may be a transmission and reception point (TRP) or a TRP group, and the TRP includes a second transmitting device 601, a second receiving device 602, and a second determining device 603, in which:

the second transmitting device 601, configured to transmit a first downlink signal to a terminal for indicating the terminal to determine a transmitting frequency of an uplink signal associated with the first downlink signal based on a downlink receiving frequency corresponding to the first downlink signal, the second receiving device 602, configured to receive the uplink signal associated with the first downlink signal transmitted by the terminal based on the transmitting frequency; and the second determining device 603, configured to determine a transmitting frequency of a second downlink signal based on a frequency shift determined from the uplink signal.

In the present embodiment of the present application, the terminal determines a corresponding downlink receiving frequency for each received first downlink signal, and determines transmitting frequency of each uplink signal based on the corresponding downlink receiving frequency. Each first downlink signal and each uplink signal have a preset association respectively, and each transmission and reception point can independently perform shift estimation and pre-compensation. The signal from each transmission and reception point is a signal after compensating Doppler shift since the downlink Doppler shift has been pre-compensated at each transmission and reception point. In the case of no error, the Doppler shift is completely compensated, and all the signals received by the UE and transmitted by the transmission and reception point have no Doppler shift, which reduces the error of channel estimation and improves the downlink transmission performance.

Figure 7:
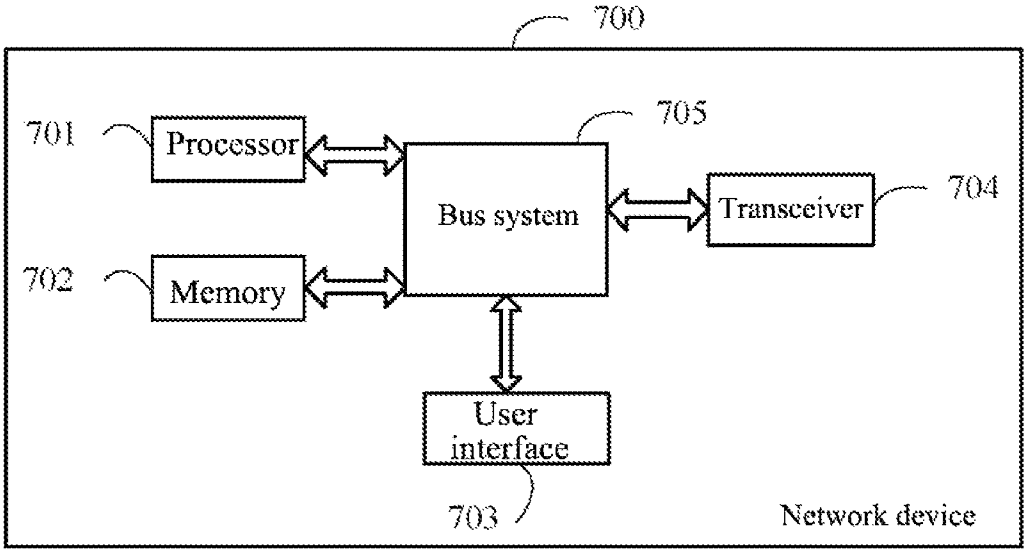
FIG. 7 is a schematic structural diagram of a network device according to another embodiment of the present application.

FIG. 7 is a schematic structural diagram of a network device provided by another embodiment of the present application. As shown in FIG. 7, the network device 700 may include at least one processor 701, a memory 702, at least one other user interface 703, and a transceiver 704. The various components in the network device 700 are coupled together by bus system 705. It should be noted that the bus system 705 is used to implement the connection communication between these components. In addition to a data bus, the bus system 705 further includes a power bus, a control bus, and a status signal bus. However, for clarity of illustration, the various buses are labeled as bus system 705 in FIG. 7 and the bus system may include any number of interconnected buses and bridges, which link various circuits including one or more processors represented by the processor 701 and memories represented by the memory 702 together. The bus system can also link various other circuits, such as peripheral devices, voltage regulators, and power management circuits together, which are well known in the art, and therefore are not described in present embodiment of the present application. The bus interface provides an interface. The transceiver 704 may be a number of elements, including a transmitter and a receiver that provide units for communicating with various other devices over a transmission medium. For different user equipment, the user interface 703 may also be an interface capable of externally/internally connecting the required equipment, and the connected equipment includes, but not limited to, a keypad, a display, a speaker, a microphone, a joystick, and the like.

It should be noted that the memory 702 in present embodiment of the present application may be a volatile memory or a non-volatile memory, or may include both volatile and non-volatile memories. The non-volatile memory may be read-only memory (ROM), programmable read-only memory (PROM), erasable programmable read-only memory (EPROM), electrically erasable programmable read-only memory (EEPROM) or flash memory. The volatile memory may be random access memory (RAM), which is used as an external cache. By a way of example and not limitation, many forms of RAM, such as static RAM (SRAM), dynamic RAM (DRAM), synchronous DRAM (SDRAM), double data rate synchronous dynamic random access memory (DDRSDRAM), enhanced synchronous dynamic random access memory (ESDRAM), synchlink dynamic random access memory (SLDRAM) and direct memory bus random access memory (Direct Rambus RAM, DRRAM) may be used. The memory 702 of the systems and methods described in various embodiments of the present application is intended to include, but not limited to, these and any other used types of memories.

The processor 701 is used for managing the bus system and general processing, and the memory 702 can store computer programs or instructions used by the processor 701 when performing operations. In one embodiment, the processor 1001 can be used for: transmitting first downlink signals to a terminal for indicating the terminal to determine a transmitting frequency of an uplink signal associated with the first downlink signal based on a downlink receiving frequency corresponding to the first downlink signal, receiving the uplink signal associated with the first downlink signal transmitted by the terminal based on the transmitting frequency; and determining a transmitting frequency of a second downlink signal based on a frequency shift determined from the uplink signal.

The methods disclosed in the above embodiments of the present application may be applied to the processor 701 or implemented by the processor 701. The processor 701 may be an integrated circuit chip with signal processing capability. In the implementation process, each step of the above-mentioned methods can be implemented by an integrated logic circuit of hardware in the processor 701 or an instruction in the form of software. The above-mentioned processor 701 may be a general-purpose processor, a digital signal processor (DSP), an application specific integrated circuit (ASIC), a field programmable gate array (FPGA) or other programmable logic devices, discrete gate or transistor logic devices, discrete hardware components capable of implementing or performing the methods, steps, and logic block diagrams disclosed in the embodiments of the present application. The general purpose processor may be a microprocessor or the processor may be any conventional processor or the like. The steps of the method disclosed in conjunction with the embodiments of the present application may be directly embodied as being executed by a hardware decoding processor, or executed by a combination of hardware and software modules in the decoding processor. The software modules may be located in random access memory, flash memory, read-only memory, programmable read-only memory or electrically erasable programmable memory, registers and other storage media in the related art. The storage medium is located in the memory 702, and the processor 701 reads the information in the memory 702, and completes the steps of the above method in combination with its hardware.

It should be noted that the embodiments described herein may be implemented by hardware, software, firmware, middleware, microcode, or a combination thereof. For hardware implementation, the processing unit may be implemented in one or more application specific integrated circuits (ASIC), digital signal processors (DSP), digital signal processing devices (DSPD), programmable Logic devices (PLD), field-programmable gate arrays (FPGA), general purpose processors, controllers, microcontrollers, microprocessors and other electronic units or a combination thereof for performing the functions described in the present application.

For software implementation, the described technology may be implemented through modules (eg, procedures, functions, etc.) that perform the functions described in the embodiments of the present application. Software codes may be stored in memory and executed by a processor. The memory can be disposed inside the processor or outside the processor.

In one embodiment, as another embodiment, the determining a transmitting frequency of a second downlink signal based on the frequency shift determined from the uplink signal include:

- determining a frequency adjustment value of a subsequent downlink signal based on the frequency shift; and
- determining the transmitting frequency of the subsequent downlink signal using the frequency adjustment value.

In one embodiment, as yet another embodiment, the association between the first downlink signal and the uplink signal includes one or more of the following:

- one or more channel properties and/or spatial Tx parameters of the uplink signals may be inferred from one or more channel properties and/or spatial transmitter (Tx) parameters of the downlink signal, or
- a receiving terminal of the uplink signal and a transmitting terminal of the downlink signal are the same network device.

In one embodiment, as still yet another embodiment, the association is quasi co-located (QCL), and a type of the association includes one or more of:

- Type 1: {Doppler shift, Doppler spread, average delay, delay spread};
- Type 2: {Doppler shift, Doppler spread};
- Type 3: {Doppler shift, average delay};
- Type 4: {Spatial Rx parameter} or {Spatial Relation Inofo};
- Type 5: {Doppler shift};
- Type 6: Frequency relation information; or
- Type 7: a new QCL type containing Doppler shift.

In one embodiment, as still yet another embodiment, the association is indicated by configuration information for the uplink signal or trigger information for the uplink signal.

In one embodiment, as still yet another embodiment, the configuration information for the uplink signal includes multiple information of the first downlink signal associated with the uplink signal, the processor is further used for: transmitting, by a network side, an activation signal for allowing the terminal to determine the first downlink signal associated with the uplink signal; or transmitting, by the network side, a trigger signal to trigger the uplink signal for allowing the terminal to determine the association according to the trigger state, where the association is associated with a trigger state, or

- the configuration information for the uplink signal or trigger information for the uplink signal further includes identifier information, and the identifier information is used for indicating a position of a resource corresponding to the first downlink signal in a resource set in which the resource corresponding to the first downlink signal is present, where the first downlink signal is associated with the uplink signal.

In one embodiment, as still yet another embodiment, the configuration information for the uplink signal or trigger information for the uplink signal and the first downlink signal includes identifier information for indicating the association, or the configuration information for the first downlink signal or trigger information for the first downlink signal includes identifier information, all uplink signals correspond to a same resource set, and each uplink signal in the resource set is in one-to-one correspondence with the identifier information, or the first downlink signal and the uplink signal respectively correspond to different resource sets, and one-to-one correspondences are predefined between an uplink resource and a first downlink resource included in the different resource sets.

In one embodiment, as still yet another embodiment, the association is indicated by configuration information for the first downlink signal or trigger information for the first downlink signal.

In one embodiment, as still yet another embodiment, the configuration information for the first downlink signal further includes multiple information of an uplink signal associated with the first downlink signal; the processor is further used for: transmitting, by a network side, an activation signal for allowing a terminal to determine the uplink signal associated with the first downlink signal; or transmitting, by the network side, a trigger signal to trigger the first downlink signal for allowing the terminal to determine the association according to the trigger state, where the association is associated with a trigger state, or the configuration information for the first downlink signal or trigger information for the first downlink signal further includes identifier information, and the identifier information is used for indicating a position of a resource corresponding to the uplink signal associated with the first downlink signal in a resource set in which the resource corresponding to the uplink signal is present.

In one embodiment, as still yet another embodiment, the uplink signal is transmitted by any one of or a combination of the following:

plink signals are allocated on different time domain resources;

the uplink signals are allocated on different frequency domain resources, and a guard interval exists between different uplink signals; and the uplink signals are not transmitted simultaneously with an uplink signal for other purposes.

In one embodiment, as still yet another embodiment, the uplink signal includes, but not limited to, one or more of the following: a sounding reference signal (SRS), a random access channel (RACH), a physical uplink shared channel (PUSCH), a physical uplink control channel (PUCCH), demodulation reference signal (DMRS) corresponding to PUSCH, or a DMRS corresponding to PUCCH.

In one embodiment, as still yet another embodiment, the first downlink signal includes, but not limited to, one or more of the following: a synchronization signal block (SSB), a tracking reference signal (TRS) or a non-zero power (NZP)-channel state information reference signal (CSI RS).

In one embodiment, as still yet another embodiment, the UE is indicated to determine whether a downlink signal is the first downlink signal based on one or more of the following information:

indication information at the network side;

configuration information on the downlink signal; or the type of the downlink signal.

The network device according to the embodiments of the present application can implement each process implemented by a network device in the foregoing embodiments, and to avoid repetition, details are not described herein again.

Embodiments of the present application are introduced from the perspectives of terminals and network devices. It should be noted that, in order to implement the above-mentioned functions, the terminals and network devices according to the embodiments of the present application include corresponding hardware structures and/or software modules for executing each function. The unit and algorithm steps of each example described in conjunction with the embodiments disclosed in the present application can be implemented in hardware or in the form of a combination of hardware and computer software.

Whether a function is performed by hardware or computer software-driven hardware depends on the specific application and design constraints of the solutions. The described functionality using different methods for each particular application, and such implementations should not be considered beyond the scope of the present application.

In present embodiment of the present application, electronic devices and the like may be divided into functional modules according to the foregoing method examples. For example, each functional module may be divided corresponding to each function, or two or more functions may be integrated into a processing module. The above-mentioned integrated modules can be implemented in the form of hardware, and can also be implemented in the form of software function modules.

It should be noted that, the modules in the embodiments of the present application are schematically divided, and the division is performed only in a logical function, and there may be other division manners in actual implementation.

The division of the above-mentioned functional modules is only illustrated for the convenience and conciseness of the description. In practical applications, the above-mentioned functions can be allocated to different functional modules as required. The internal structure of the device is divided into different functional modules to complete all or part of the functions described above. For the specific working process of the system, device and unit described above, reference may be made to the corresponding process in the foregoing method embodiments, and details are not described herein again.

In some embodiments according to the present application, it should be noted that the disclosed device and method may be implemented in other manners. For example, the device embodiments described above are only illustrative. The modules or units are divided in terms of only logical functions and may be divided otherwise in actual implementation. For example, multiple units or components may be incorporated or may either be integrated into another system, or some features may be omitted, or not implemented. On the other hand, the shown or discussed mutual coupling or direct coupling or communication connection may be indirect coupling or communication connection of devices or units through some interfaces.

The units described as separate components may or may not be physically separated, and components displayed as units may or may not be physical units, that is, may be located in one place, or may be distributed to multiple network units. Some or all of the units may be selected according to actual needs to implement the embodiments in present application.

In addition, functional units in each embodiment of the present application may be integrated into a processing unit, or functional units may exist physically alone, or two or more units may be integrated into a unit. The above-mentioned integrated units may be implemented in the form of software functional units.

The integrated unit, if implemented in the form of a software functional unit and sold or used as an independent product, may be stored in a computer-readable storage medium. Based on such understanding, all or part of the embodiments can be embodied in the form of a software product, and the computer software product is stored in a storage medium and includes several instructions to cause a computer device (which can be a personal computer, a server, or a network device, etc.) or a processor to execute all or part of the steps of the methods described in the various embodiments of the present application. The computer storage medium is a non-transitory medium, including: a flash memory, a removable hard disk, a read-only memory, a random access memory, a magnetic disk or a compact disk and other mediums having stored thereon program codes.

The non-transitory computer-readable storage medium according to the embodiments of the present application is specifically used to execute the process of the method for transmitting signals according to the above method embodiments. For specific functions and processes, reference may be made to the above method embodiments, which are not repeated here.

What is claimed is:

1. A method for transmitting signals, performed by a terminal, and the method comprising:

receiving multiple first downlink signals transmitted by a network device;

determining a downlink receiving frequency corresponding to each of the multiple first downlink signals, and determining a transmitting frequency of an uplink signal associated with each of the first downlink signals based on the downlink receiving frequency corresponding to the each of the first downlink signals in combination with a frequency shift between an uplink and a downlink, wherein the frequency shift between the uplink and the downlink is defined in a protocol, or configured through a signaling, or determined based on frequency indication information; and transmitting the uplink signal to the network device based on the transmitting frequency of the uplink signal, wherein a frequency shift determined based on the uplink signal associated with the first downlink signal is used to determine a transmitting frequency of a second downlink signal.

2. The method of claim 1, wherein the association between the first downlink signal and the uplink signal comprises one or more of the following:

one or more channel properties and/or spatial transmitter (Tx) parameters of the uplink signal are inferred from one or more channel properties and/or spatial transmitter (Tx) parameters of the first downlink signal, and a receiving terminal of the uplink signal and a transmitting terminal of the first downlink signal are the same network device.

3. The method of claim 2, wherein the association is quasi co-located (QCL), and a type of the association comprises one or more of:

Type 1: {Doppler shift, Doppler spread, average delay, delay spread};

Type 2: {Doppler shift, Doppler spread};

Type 3: {Doppler shift, average delay};

Type 4: {Spatial receiver (Rx) parameter} or {Spatial Relation Inofo};

Type 5: {Doppler shift}; or

Type 6: Frequency relation information.

4. The method of claim 2, wherein the association is indicated by configuration information for the uplink signal or trigger information for the uplink signal; or the association is indicated by configuration information for the first downlink signal or trigger information for the first downlink signal.

5. The method of claim 4, wherein in case that the association is indicated by configuration information for the uplink signal or trigger information for the uplink signal, the configuration information for the uplink signal or trigger information for the uplink signal comprises multiple pieces of information of the first downlink signal associated with the uplink signal, the method further comprises: determining the first downlink signal associated with the uplink signal based on an activation signal transmitted by a network device, or the configuration information for the uplink signal or trigger information for the uplink signal comprises multiple pieces of information of the first downlink signal associated with the uplink signal, the method further comprises: determining the association based on a trigger state when the uplink signal is triggered, wherein each association is associated with one trigger state, or the configuration information for the uplink signal or trigger information for the uplink signal further comprises identifier information, and the identifier information is used for indicating a position of a resource corresponding to the first downlink signal in a resource set in which the resource corresponding to the first downlink signal is present, the first downlink signal being associated with the uplink signal.

6. The method of claim 1, wherein configuration information for the uplink signal or trigger information for the uplink signal and configuration information for the first downlink signal or trigger information for the first downlink signal comprises identifier information for indicating the association between the first downlink signal and the uplink signal, or the configuration information for the first downlink signal or the trigger information for the first downlink signal comprises identifier information, all uplink signals correspond to a same resource set, and the uplink signal corresponding to the resource set is in one-to-one correspondence with the identifier information, or the first downlink signal and the uplink signal respectively correspond to different resource sets, and one-to-one correspondences are predefined between an uplink resource and a first downlink resource comprised in different resource sets.

7. The method of claim 4, wherein in case that the association is indicated by configuration information for the first downlink signal or trigger information for the first downlink signal, the configuration information for the first downlink signal comprises multiple pieces of information of an uplink signal associated with the first downlink signal; the method further comprises: determining the uplink signal associated with the first downlink signal based on an activation signal transmitted by a network device, or the configuration information for the first downlink signal comprises multiple pieces of information of an uplink signal associated with the first downlink signal; the method further comprises: determining the association based on a trigger state when the first downlink signal is triggered, wherein each association is associated with one trigger state, or the configuration information for the first downlink signal or trigger information for the first downlink signal further comprises identifier information, and the identifier information is used for indicating a position of a resource corresponding to the uplink signal in a resource set in which the resource corresponding to the uplink signal is present, the first downlink signal being associated with the uplink signal.

8. The method of claim 1, wherein the transmitting the uplink signal to the network device based on the transmitting frequency of the uplink signal comprises one or more of the following:

uplink signals are allocated on different time domain resources;

the uplink signals are allocated on different frequency domain resources, and a guard interval exists between different uplink signals; or the uplink signals are not transmitted simultaneously with an uplink signal for other purposes.

9. The method of claim 1, wherein the first downlink signal is determined based on one or more of the following information:

indication information at the network side;

configuration information on the downlink signal; or a type of the downlink signal.

10. A method for transmitting signals, performed by a network device, and the method comprising:

transmitting multiple first downlink signals to a terminal, wherein the first downlink signals are used to determine a transmitting frequency of an uplink signal associated with each of the first downlink signals based on a downlink receiving frequency corresponding to the each of the first downlink signals in combination with a frequency shift between an uplink and a downlink, the frequency shift between the uplink and the downlink is defined in a protocol, or configured through a signaling, or determined based on frequency indication information;

receiving the uplink signal associated with the first downlink signal transmitted by the terminal based on the transmitting frequency; and determining a transmitting frequency of a second downlink signal based on a frequency shift determined from the uplink signal.

11. The method of claim 10, wherein the determining a transmitting frequency of a second downlink signal based on the frequency shift determined from the uplink signal comprises:

determining a frequency adjustment value of the second downlink signal based on the frequency shift; and determining a transmitting frequency of the second downlink signal using the frequency adjustment value.

12. The method of claim 10, wherein the association between the first downlink signal and the uplink signal comprises one or more of the following:

one or more channel properties and/or spatial transmitter (Tx) parameters of the uplink signal are inferred from one or more channel properties and/or spatial transmitter (Tx) parameters of the first downlink signal, or a receiving terminal of the uplink signal and a transmitting terminal of the first downlink signal are the same network device.

13. The method of claim 12, wherein the association is quasi co-located (QCL), and a type of the association comprises one or more of:

Type 1: {Doppler shift, Doppler spread, average delay, delay spread};

Type 2: {Doppler shift, Doppler spread};

Type 3: {Doppler shift, average delay};

Type 4: {Spatial receiver (Rx) parameter} or {Spatial Relation Inofo};

Type 5: {Doppler shift}; or

Type 6: Frequency relation information.

14. The method of claim 11, wherein the association is indicated by configuration information for the uplink signal or trigger information for the uplink signal; or the association is indicated by configuration information for the first downlink signal or trigger information for the first downlink signal.

15. The method of claim 14, wherein in case that the association is indicated by configuration information for the uplink signal or trigger information for the uplink signal, the configuration information for the uplink signal or trigger information for the uplink signal comprises multiple pieces of information of the first downlink signal associated with the uplink signal, the method further comprises: determining the first downlink signal associated with the uplink signal based on an activation signal transmitted by a network device; or the configuration information for the uplink signal or trigger information for the uplink signal comprises multiple pieces of information of the first downlink signal associated with the uplink signal, the method further comprises: determining the association based on a trigger state when the uplink signal is triggered, wherein each association is associated with one trigger state, or the configuration information for the uplink signal or trigger information for the uplink signal comprises identifier information, and the identifier information is used for indicating a position of a resource corresponding to the first downlink signal in a resource set in which the resource corresponding to the first downlink signal is present, the first downlink signal being associated with the uplink signal.

16. The method of claim 10, wherein configuration information for the uplink signal or trigger information for the uplink signal and configuration information for the first downlink signal or trigger information for the first downlink signal comprises identifier information for indicating the association, or the configuration information for the first downlink signal or the trigger information for the first downlink signal comprises identifier information, all uplink signals correspond to a same resource set, and the uplink signal corresponding to the resource set is in one-to-one correspondence with the identifier information, or the first downlink signal and the uplink signal respectively correspond to different resource sets, and one-to-one correspondences are predefined between an uplink resource and a first downlink resource comprised in different resource sets.

17. The method of claim 14, wherein in case that the association is indicated by configuration information for the first downlink signal or trigger information for the first downlink signal, the configuration information for the first downlink signal comprises multiple pieces of information of an uplink signal associated with the first downlink signal; the method further comprises: determining the uplink signal associated with the first downlink signal based on an activation signal transmitted by a network device; or the configuration information for the first downlink signal comprises multiple pieces of information of an uplink signal associated with the first downlink signal; the method further comprises: determining the association based on a trigger state when a downlink signal is triggered, wherein each association is associated with one trigger state, or the configuration information for the first downlink signal or trigger information for the first downlink signal further comprises identifier information, and the identifier information is used for indicating a position of a resource corresponding to the uplink signal associated with the first downlink signal in a resource set in which the resource corresponding to the uplink signal is present.

18. The method of claim 10, wherein the uplink signals are transmitted by one or more of the following modes:

uplink signals are allocated on different time domain resources;

the uplink signals are allocated on different frequency domain resources, and a guard interval exists between different uplink signals; or the uplink signals are not transmitted simultaneously with an uplink signal for other purposes.

19. The method of claim 10, wherein the network side indicates the first downlink signal to the terminal based on one or more of the following information:

indication information at the network side;

configuration information on the downlink signal; or a type of the downlink signal.

20. A terminal, comprising:

a processor and a memory storing a program that is executable on the processor, the program, when executed by the processor, causes the terminal to perform the following steps:

receiving multiple first downlink signals transmitted by a network device;

determining a downlink receiving frequency corresponding to each of the multiple first downlink signals, and determining a transmitting frequency of an uplink signal associated with each of the first downlink signals based on the downlink receiving frequency corresponding to the each of the first downlink signals in combination with a frequency shift between an uplink and a downlink, wherein the frequency shift between the uplink and the downlink is defined in a protocol, or configured through a signaling, or determined based on frequency indication information; and transmitting the uplink signal to the network device based on the transmitting frequency of the uplink signal, wherein a frequency shift determined based on the uplink signal associated with the first downlink signal is used to determine a transmitting frequency of a second downlink signal.

21. A network device, comprising:

a processor; and a memory storing a program that is executable on the processor, the program, when executed by the processor, causes the network device to perform steps of claim 10.

* * * * *